US011734885B2

(12) United States Patent
Manivasagam et al.

(10) Patent No.: US 11,734,885 B2
(45) Date of Patent: Aug. 22, 2023

(54) SYSTEMS AND METHODS FOR GENERATING SYNTHETIC LIGHT DETECTION AND RANGING DATA VIA MACHINE LEARNING

(71) Applicant: UATC, LLC, Mountain View, CA (US)

(72) Inventors: Sivabalan Manivasagam, Toronto (CA); Shenlong Wang, Toronto (CA); Wei-Chiu Ma, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/958,797

(22) Filed: Oct. 3, 2022

(65) Prior Publication Data

US 2023/0044625 A1 Feb. 9, 2023

Related U.S. Application Data

(63) Continuation of application No. 16/567,607, filed on Sep. 11, 2019, now Pat. No. 11,461,963.
(Continued)

(51) Int. Cl.
*G06T 15/00* (2011.01)
*G06T 17/05* (2011.01)
(Continued)

(52) U.S. Cl.
CPC .............. *G06T 17/05* (2013.01); *G01S 17/89* (2013.01); *G01S 17/931* (2020.01);
(Continued)

(58) Field of Classification Search
CPC ........ G06T 15/506; G06T 15/50; G06T 15/80; G06T 15/60; G06T 15/06
(Continued)

(56) References Cited

U.S. PATENT DOCUMENTS 10,699,167 B1   6/2020  Dowdall et al.
10,839,530 B1 * 11/2020 Berger ..................... G06T 15/08
(Continued)

OTHER PUBLICATIONS

Alhaija et al, "Augmented Reality Meets Computer Vision: Efficient Data Generation for Urban Driving Scenes", arXiv:1708vl, Aug. 4, 2017, 12 pages.
(Continued)

*Primary Examiner* — Gordon G Liu
(74) *Attorney, Agent, or Firm* — Dority & Manning, P.A.

(57) ABSTRACT

The present disclosure provides systems and methods that combine physics-based systems with machine learning to generate synthetic LiDAR data that accurately mimics a real-world LiDAR sensor system. In particular, aspects of the present disclosure combine physics-based rendering with machine-learned models such as deep neural networks to simulate both the geometry and intensity of the LiDAR sensor. As one example, a physics-based ray casting approach can be used on a three-dimensional map of an environment to generate an initial three-dimensional point cloud that mimics LiDAR data. According to an aspect of the present disclosure, a machine-learned geometry model can predict one or more adjusted depths for one or more of the points in the initial three-dimensional point cloud, thereby generating an adjusted three-dimensional point cloud which more realistically simulates real-world LiDAR data.

20 Claims, 9 Drawing Sheets

Related U.S. Application Data

(60) Provisional application No. 62/834,596, filed on Apr. 16, 2019, provisional application No. 62/768,850, filed on Nov. 16, 2018.

(51) Int. Cl.
```
G06T 15/06      (2011.01)
G06N 20/00      (2019.01)
G05D 1/02       (2020.01)
G07C 5/02       (2006.01)
G01S 17/89      (2020.01)
G01S 17/931     (2020.01)
```
(52) U.S. Cl.
CPC ........... *G05D 1/0231* (2013.01); *G06N 20/00* (2019.01); *G06T 15/06* (2013.01); *G07C 5/02* (2013.01); *G05D 2201/0213* (2013.01)

(58) Field of Classification Search
USPC ........................................................ 345/426
See application file for complete search history.

(56) References Cited

U.S. PATENT DOCUMENTS

| | | |
|---|---|---|
| 2017/0200309 A1 | 7/2017 | Qian et al. |
| 2019/0096125 A1 | 3/2019 | Schulter et al. |
| 2019/0302259 A1* | 10/2019 | Van Fleet ............... G05D 1/024 |
| 2019/0303759 A1* | 10/2019 | Farabet .................. G06V 20/56 |
| 2020/0110158 A1 | 4/2020 | Ecins et al. |
| 2020/0118281 A1 | 4/2020 | Kwon et al. |

OTHER PUBLICATIONS

Bai et al, "Deep Multi-Sensor Lane Detection", arXiv:1905vl, May 4, 2019, 8 pages.
Besl et al, "Method for Registration of 3-D Shapes", Transactions on Pattern Analysis and Machine Intelligence, vol. 14, No. 2, Feb. 1992, pp. 239-256.
Butler et al, "A Naturalistic Open Source Movie for Optical Flow Evaluation", Conference on Computer Vision, Oct. 7-13, 2012, Florence, Italy, pp. 611-625.
Chen et al, "Multi-View 3D Object Detection Network for Autonomous Driving", arXiv:1611v3, Jun. 22, 2017, 9 pages.
Choy et al, "3D-R2N2: A Unified Approach for Single and Multi-View 3D Object Reconstruction", Conference on Computer Vision, Jun. 26-Jul. 1, 2016, Las Vegas, Nevada, 17 pages.
Deschaud et al, "Automatic Data Driven Vegetation Modeling for Lidar Simulation", Conference on Robotics and Automation, May 14-18, 2012, St. Paul, Minnesota, 7 pages.
Dewan et al, "Rigid Scene Flow for 3D Lidar Scans", Conference on Intelligent Robots and Systems, Oct. 9-14, 2016, Daejeon, Korea, 6 pages.
Dosovitskiy et al, "CARLA: An Open Urban Driving Simulator", arXiv:1711vl, Nov. 10, 2017, 16 pages.
Epic Games, "The Most Powerful Real-Time 3D Creation Platform—Unreal Engine", http://www.unrealengine.com/, retrieved Oct. 20, 2020, 7 pages.
Fang et al, "Augmented LiDAR Simulator for Autonomous Driving", arXiv: 1811.07112v2, 10 pages.
Fang et al, "Simulating LIDAR Point Cloud for Autonomous Driving Using Real-World Scenes and Traffic Flows", 2018, 7 pages.
Gaidon et al, "Virtual Worlds as Proxy for Multi-Object Tracking Analysis", arXiv:1605vl, May 20, 2016, 10 pages.
Gschwandtner et al, "BlenSor: Blender Sensor Simulation Toolbox", Conference on Advances in Visual Computing, Sep. 26-28, 2011, Las Vegas, Nevada, 10 pages.
International Search Report and Written Opinion for Application No. PCT/US2020/024169, dated Sep. 4, 2020, 17 pages.
Johnson et al, "The Malmo Platform for Artificial Intelligence Experimentation", Conference on Artificial Intelligence, Aug. 7-11, 2011, San Francisco, California, 2 pages.
Kempka et al, "ViZDoom: A Doom-Based AI Research Platform for Visual Reinforcement Learning", arXiv:1605v2, Sep. 20, 2016, 8 pages.
Kingma et al, "Adam: A Method for Stochastic Optimization", arXiv:1412vl, Dec. 22, 2014, 9 pages.
Luo et al, "Fast and Furious: Real Time End-to-End 3D Detection, Tracking and Motion Forecasting with a Single Convolutional Net", Conference on Computer Vision and Pattern Recognition, Jun. 18-22, 2018, Salt Lake City, Utah, pp. 3569-3577.
Maturana et al, "VoxNet: A 3D Convolutional Neural Network for Real-Time Object Recognition", Conference on Intelligent Robots and Systems, Sep. 28-Oct. 2, 2015, Hamburg, Germany, 7 pages.
Mayer et al, "A Large Dataset to Train Convolutional Networks for Disparity, Optical Flow and Scene Flow Estimation", arXiv:1512vl, Dec. 7, 2015, 14 pages.
Mnih et al, "Playing Atari with Deep Reinforcement Learning", arXiv:1312vl, Dec. 19, 2013, 9 pages.
Moller et al, "Fast, Minimum Storage Ray-Triangle Intersection", Journal of Graphics Tools, vol. 2, Issue 1, Apr. 6, 2012, 7 pages.
Pomerleau "ALVINN: An Autonomous Land Vehicle in a Neural Network", Advances in Neural Information Processing Systems, 1988, pp. 305-313.
Qi et al, "PointNet: Deep Learning on Point Sets for 3D Classification and Segmentation", arXiv:1612v2, Apr. 10, 2017, 19 pages.
Qi et al, "Volumetric and Multi-View CNNs for Object Classification on 3D Data", arXiv:1604v2, Apr. 29, 2016, 14 pages.
Richter et al, "Playing for Benchmarks", arXiv:1709vl, Sep. 21, 2017, 10 pages.
Riegler et al, "OctNet: Learning Deep 3D Representations at High Resolutions", arXiv:1611v4, Apr. 10, 2017, 21 pages.
Ronneberger et al, "U-Net: Convolutional Networks for Biomedical Image Segmentation", arXiv:1505vl, May 18, 2015, 8 pages.
Ros et al, "The SYNTHIA Dataset: A Large Collection of Synthetic Images for Semantic Segmentation of Urban Scenes", Conference on Computer Vision and Pattern Recognition, Jun. 26-Jul. 1, 2016, Las Vegas, Nevada, pp. 3234-3243.
Shrivastava et al, "Learning from Simulated and Unsupervised Images through Adversarial Training", arXiv:1612v2, Jul. 19, 2017, 16 pages.
Song et al, "Deep Sliding Shapes for Amodal 3D Object Detection in RGB-D Images", Conference on Computer Vision and Pattern Recognition, Jun. 26-Jul. 1, 2016, Las Vegas, Nevada, 9 pages.
Sun et al, "PWC-Net: CNNs for Optical Flow Using Pyramid, Warping and Cost Volume", arXiv:1719v3, Jun. 25, 2018, 18 pages.
Tan et al, "Sim-To-Real: Learning Agile Locomotion for Quadruped Robots", arXiv:1804v2, May 16, 2018, 11 pages.
Thrun et al, "The GraphSLAM Algorithm with Applications to Large-Scale Mapping of Urban Structures", Journal of Robotics Research, vol. 25, May-Jun. 2006, pp. 403-429.
Todorov et al, "MuJoCo: A Physics Engine for Model-Based Control", Conference on Intelligent Robots and Systems, Oct. 7-12, 2012, Vilamoura, Algarve, Portugal, 8 pages.
Unity "Performance By Default, Next-Gen Rendering and Artist Tooling", https://unity3d.com, retrieved on Jul. 31, 2019, 12 pages.
Unity, "Unity Real-Time Development Platform—Unity Game Engine—Official Site", 2008, http://unity3d.com, retrieved on Oct. 20, 2020, 13 pages.
Unreal Engine, https://unrealengine.com, retrieved on Jul. 31, 2019, 8 pages.
Velodyne Manual "High Definition LiDAR Sensor", Velodyne, Inc., Morgan Hill, California, 2013, 54 pages.
Velodyne LiDAR, Inc., "User Manual", San Jose, California, 2018, 146 pages.
Wang et al, "Deep Parametric Continuous Convolutional Neural Networks" Conference on Computer Vision and Pattern Recognition, Jun. 18-22, 2018, Salt Lake City, Utah, pp. 2589-2597.
Wu et al., "SqueezeSegV2: Improved Model Structure and Unsupervised Domain Adaption for Road-Object Segmentation from a LiDAR Point Cloud", arXiv: 1809.08495v1, 7 pages.

(56) References Cited

OTHER PUBLICATIONS

TORCS, "The Open Racing Car Simulator", http://torcs.sourceforge.net, retrieved on Jul. 30, 2019, 4 pages.
Xia et al, "Gibson Env: Real-World Perception for Embodied Agents", arXiv:1808v1, Aug. 31, 2018, 12 pages.
Yang et al, "PIXOR: Real-Time 3D Object Detection from Point Clouds", Conference on Computer Vision and Pattern Recognition, Jun. 18-22, 2018, Salt Lake City, Utah, pp. 7652-7660.
Yi et al, "SyncSpecCNN: Synchronized Spectral CNN for 3D Shape Segmentation", arXiv:1612v1, Dec. 2, 2016, 11 pages.
Yue et al., "A LiDAR Point Cloud Generator: from a Virtual World to Autonomous Driving", arXiv:1804.00103v1, 7 pages.
Zhang et al, "Road Extraction by Deep Residual U-Net." IEEE Geoscience and Remote Sensing Letters, vol. 15, No. 5, May 2018, pp. 749-753.
Zhang et al, "Efficient Convolutions for Real-Time Semantic Segmentation of 3D Point Clouds", Conference on 3DVision, Sep. 5-8, 2018, Verona, Italy, 10 pages.
Zhou et al, "Open3D: A Modern Library for 3D Data Processing", arXiv:1801v1, Jan. 30, 2018, 6 pages.
Zhu et al, "Target-Driven Visual Navigation in Indoor Scenes Using Deep Reinforcement Learning", arXiv:1609v1, Sep. 16, 2016, 8 pages.

\* cited by examiner

SYSTEMS AND METHODS FOR GENERATING SYNTHETIC LIGHT DETECTION AND RANGING DATA VIA MACHINE LEARNING

PRIORITY CLAIM

The present application is a continuation of U.S. patent application Ser. No. 16/567,607, filed Sep. 11, 2019. U.S. patent application Ser. No. 16/567,607 is hereby incorporated by reference herein in its entirety. U.S. patent application Ser. No. 16/567,607 claims priority to and the benefit of U.S. Provisional Patent Application No. 62/768,850, filed Nov. 16, 2018 and U.S. Provisional Patent Application No. 62/834,596, filed Apr. 16, 2019. U.S. Provisional Patent Application No. 62/768,850 is hereby incorporated by reference herein in its entirety. U.S. Provisional Patent Application No. 62/834,596 is hereby incorporated by reference herein in its entirety.

FIELD

The present disclosure relates generally to the application of machine learning to light detection and ranging data. More particularly, the present disclosure relates to systems and methods that combine physics-based systems with machine learning to generate synthetic light detection and ranging data.

BACKGROUND

Light detection and ranging (LiDAR) is a technique that measures distance to one or more surrounding objects by illuminating the objects with pulsed laser light and measuring the reflected pulses with a sensor. Differences in laser return times and wavelengths can then be used to make three-dimensional representations of the surrounding objects. For example, the three-dimensional representations may take the form of three-dimensional point clouds.

One example application of LiDAR technology is in the field of autonomous vehicles. In particular, an autonomous vehicle can be equipped with a LiDAR system and can use the LiDAR system to generate a representation of its surrounding environment (e.g., road surface, buildings, other vehicles, pedestrians, etc.). The autonomous vehicle can attempt to comprehend the surrounding environment by performing various processing techniques on the LiDAR data collected by the LiDAR system. Given knowledge of its surrounding environment, the autonomous vehicle can use various control techniques to navigate through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to generate synthetic light detection and ranging (LiDAR) data. The method includes obtaining, by a computing system comprising one or more computing devices, a three-dimensional map of an environment. The method includes determining, by the computing system, a trajectory that describes a series of locations of a virtual object relative to the environment over time. The method includes performing, by the computing system, ray casting on the three-dimensional map according to the trajectory to generate an initial three-dimensional point cloud that comprises a plurality of points, wherein at least a respective depth is associated with each of the plurality of points. The method includes processing, by the computing system using a machine-learned geometry network, the initial three-dimensional point cloud to predict a respective adjusted depth for one or more of the plurality of points. The method includes generating, by the computing system, an adjusted three-dimensional point cloud in which the one or more of the plurality of points have the respective adjusted depth predicted by the machine-learned geometry network.

Another example aspect of the present disclosure is directed to computing system. The computing system includes one or more processors, a machine-learned geometry model, and one or more non-transitory computer-readable media that collectively store instructions that, when executed by the one or more processors, cause the computing system to perform operations. The operations include obtaining a ground truth three-dimensional point cloud collected by a physical LiDAR system as the physical LiDAR system travelled along a trajectory through an environment. The operations include obtaining a three-dimensional map of the environment. The operations include performing ray casting on the three-dimensional map according to the trajectory to generate an initial three-dimensional point cloud that comprises a plurality of points, wherein at least a respective depth is associated with each of the plurality of points. The operations include processing, by the machine-learned geometry model, the initial three-dimensional point cloud to predict a respective adjusted depth for one or more of the plurality of points. The operations include generating an adjusted three-dimensional point cloud in which the one or more of the plurality of points have the respective adjusted depth predicted by the machine-learned geometry network. The operations include evaluating an objective function that compares the adjusted three-dimensional point cloud to the ground truth three-dimensional point cloud. The operations include modifying one or more values of one or more parameters of the machine-learned geometry model based at least in part on the objective function.

Another example aspect of the present disclosure is directed to one or more non-transitory computer-readable media that collectively store instructions that, when executed by one or more processors, cause the one or more processor to perform operations. The operations include obtaining a three-dimensional map of an environment. The operations include determining a trajectory that describes a series of locations of a virtual object relative to the environment over time. The operations include performing ray casting on the three-dimensional map according to the trajectory to generate an initial three-dimensional point cloud that comprises a plurality of points, wherein at least a respective depth is associated with each of the plurality of points. The operations include processing, using a machine-learned geometry network, the initial three-dimensional point cloud to predict a respective adjusted depth for one or more of the plurality of points. The operations include generating an adjusted three-dimensional point cloud in which the one or more of the plurality of points have the respective adjusted depth predicted by the machine-learned geometry network.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
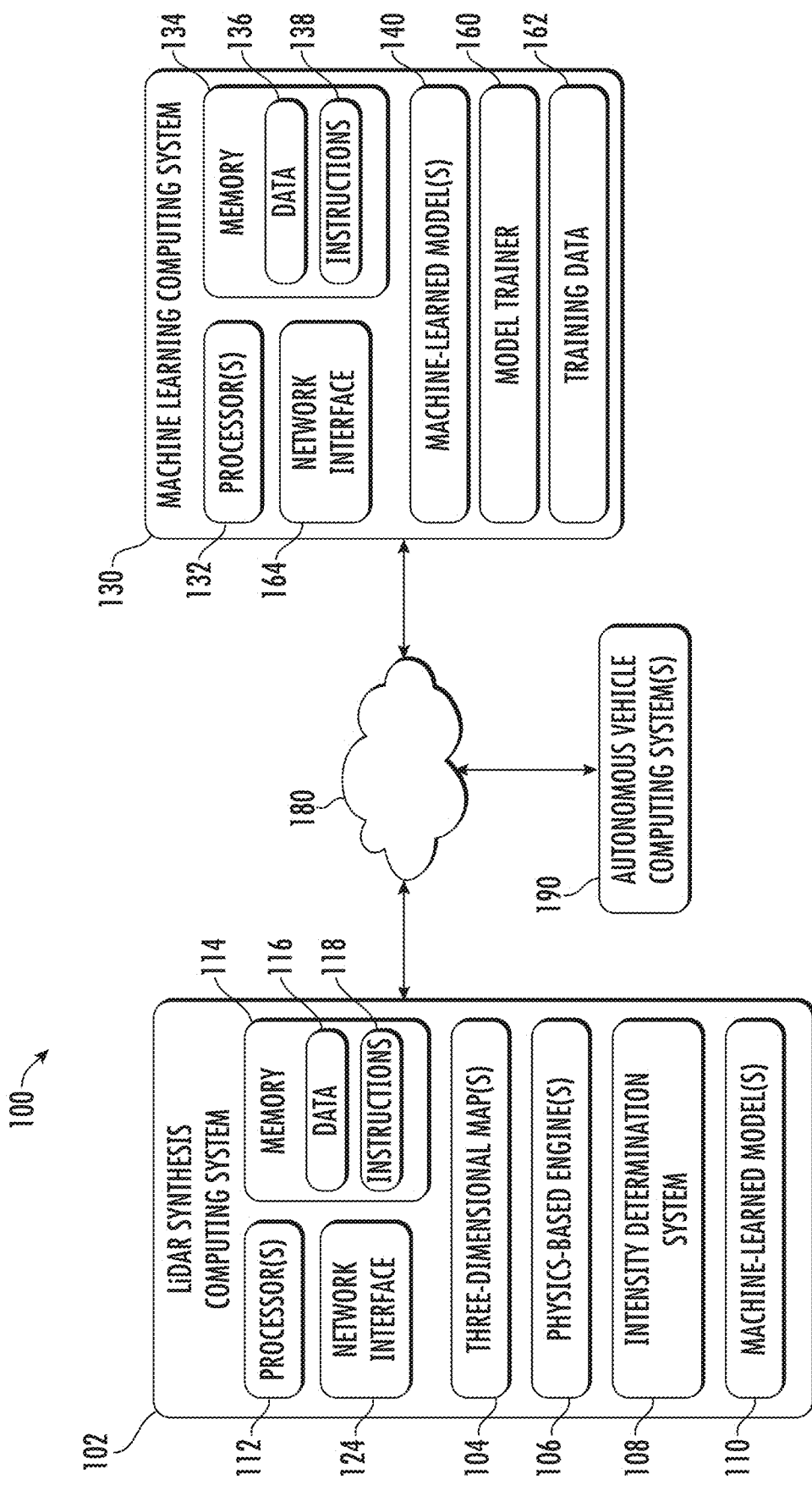
FIG. 1 depicts a block diagram of an example computing system according to example embodiments of the present disclosure.

Generally, the present disclosure is directed to systems and methods that combine physics-based systems with machine learning to generate synthetic LiDAR data that accurately mimics a real-world LiDAR sensor system. In particular, aspects of the present disclosure combine physics-based rendering with machine-learned models such as deep neural networks to simulate both the geometry and intensity of the LiDAR sensor. As one example, a physics-based ray casting approach can be used on a three-dimensional map of an environment to generate an initial three-dimensional point cloud that mimics LiDAR data. According to an aspect of the present disclosure, a machine-learned geometry model can predict one or more adjusted depths for one or more of the points in the initial three-dimensional point cloud, thereby generating an adjusted three-dimensional point cloud which more realistically simulates real-world LiDAR data. The simulated LiDAR data can be used, for example, as simulated input for testing autonomous vehicle control systems. The systems and methods of the present disclosure improve both quantitatively and qualitatively the geometry of the synthesized LiDAR data over solely physics-based rendering. The reconstruction quality and improved visual perceptual quality of the synthesized LiDAR point cloud demonstrates the potential of this LiDAR simulation approach and application to generating realistic sensor data.

More particularly, LiDAR sensors have been shown to be the sensor of preference for most robotics applications. This is due to the fact that they produce semi-dense 3D point clouds from which 3D estimation is much simpler and more accurate when compared to using cameras. Deep learning approaches can be used to perform 3D object detection, 3D semantic segmentation, and online mapping from 3D point clouds.

Developing a robust robotic system such as a self-driving car requires testing it under as many scenarios as possible. However, it is significantly challenging to test certain corner cases such as rare events like traffic accidents to uncooperative objects such as animals entering a travelway. This urges the need to build reliable simulation systems with high fidelity that could test how a robot (e.g., autonomous vehicle) would react under such circumstances.

However, most existing simulation systems mainly focus on simulating behaviors and physics instead of sensory input, which isolates the robot's perception system from the simulating world. However, the perception system's performance is particularly important under those safety-critical situations. Modern perception systems are based on deep learning, whose performance can improve with the existence of more labeled data. Obtaining accurate 3D labels is, however, a very expensive process, even when employing crowd sourcing solutions.

A much more cost effective alternative is to leverage simulation to produce new views of the world (e.g., in the form of simulated sensor data such as simulated LiDAR data). This is particularly important in order to have access to a large set of examples of rare events and safety critical situations, which are key for building reliable self-driving cars.

Certain existing approaches to LiDAR simulation for autonomous driving focus on employing handcrafted 3D primitives (such as buildings, cars, trees, roads). Graphics engines have been utilized to ray cast the scene and create virtual LiDAR data. While this simulated LiDAR accurately represents the handcrafted virtual world, it does not actually reflect the statistics and characteristics of real-world LiDAR point clouds. One can easily distinguish between virtual and real LiDAR, as virtual LiDAR is much cleaner and has sharper occlusions. By contrast, real LiDAR contains spurious points as well as missing points. Many factors contribute to the lack of realism, including unrealistic meshes, simplistic virtual worlds, and simplified physics assumptions.

In particular, LiDAR data generated from physics-based rendering has many artifacts. These artifacts exist because meshes created from real-world scans are not geometrically perfect. Meshes built from real world scans can contain holes and errors in position and computed normals due to sensor noise, errors in localization, and errors in segmentation (e.g., of dynamic objects)/

In addition, geometry is only part of the equation. LiDAR point clouds contain intensity returns, which are typically exploited in applications such as lane detection, semantic segmentation and construction detection, as the reflectivity of some materials is very informative. Intensity returns are very difficult to simulate as they depend on many factors including incidence angle, material reflectivity, laser bias, and atmospheric transmittance, as well as black box normalization procedures that are done by the LiDAR provider.

An alternative approach is to learn (e.g., via machine learning techniques) to wholly simulate LiDAR point clouds from scratch. This is, however, a very difficult process and very large training sets are required for such an approach to produce solutions that can compete with physics-based simulation. Due to the lack of training sets and the significant computational complexity involved, workable solutions which use machine-learned models to entirely generate large-scale point clouds for real-world scenes from scratch have not yet been proposed.

In contrast, the systems and methods of the present disclosure leverage the best of learning-based and physics-based approaches. In particular, the present disclosure proposes an architecture where a machine-learned geometry model is trained to modify physics-based renderings and intensity is simulated via a data-driven approach.

In particular, aspects of the present disclosure are directed to systems and methods that use a machine-learned geometry model to make an initial three-dimensional point cloud generated using a physics-based approach more realistic. In particular, the machine-learned geometry model can learn (e.g., through either a generative adversarial approach and/or a direct spatial comparison approach) to modify the geometry of point clouds generated through ray casting and/or other physics-based approaches to better match ground truth counterparts that were physically collected by LiDAR systems in the real world.

In some implementations, to generate new synthetic LiDAR data that simulates LiDAR data collected in a particular environment (e.g., a particular real-world location such as a particular street corner), a computing system can obtain a three-dimensional map of the environment (e.g., a three-dimensional map of the particular street corner). The three-dimensional map can be any type of map that can be used by a physics-based approach to generate an initial three-dimensional point cloud that simulates LiDAR data captured within the environment. As one example, the three-dimensional map can be a map that includes a plurality of surface elements (which may, in some instances, be referred to as "surfels") that indicate the respective surfaces of various objects (e.g., buildings, road surfaces, curbs, trees, etc.) within the environment. Metadata such as surface normal and/or other surface information can be associated with each surface element.

In some implementations, the computing system can generate the three-dimensional map of the environment from a set of previous LiDAR scans that were performed at such environment. The map can be generated at the time at which the synthetic LiDAR data is desired or can be pre-generated (e.g., as a batch), stored in memory, and then later accessed or otherwise obtained to assist in generating the synthetic LiDAR data. Thus, in some implementations, to generate a three-dimensional map of an environment, the computing system can first obtain a plurality of sets of real-world LiDAR data physically collected by one or more LiDAR systems in the environment. For example, these sets of real-world LiDAR data can have been collected by autonomous vehicles and/or non-autonomous vehicles as they traveled through the environment.

In some implementations, the computing system can remove one or more moving objects from the plurality of sets of real-world LiDAR data. In some implementations, one or more segmentation algorithms can be performed to assign a semantic class (e.g., pedestrian, street sign, tree, curb, etc.) to each point (or group of points) in each set of real-world LiDAR data. Points that have been assigned to semantic classes that are non-stationary (e.g., vehicle, bicyclist, pedestrian, etc.) can be removed from the real-world LiDAR point clouds.

The computing system can associate the plurality of sets of real-world LiDAR data to a common coordinate system to generate an aggregate LiDAR point cloud. For example, each set of LiDAR data can be transitioned from respective vehicle coordinate system to a common coordinate system based on a respective pose (e.g., location and orientation) of the vehicle at the time of data collection.

The computing system can convert the aggregate LiDAR point cloud to a surface element-based three-dimensional mesh. For example, the computing system can perform voxel-based downsampling and normal estimation to perform the conversion. In addition to the geometric information, sensory metadata (e.g., incidence angle, raw intensity, transmitted power level, range value, unique ID per beam, etc.) can be recorded for each surface element (e.g., to be used for intensity simulation).

In some implementations, additional mesh representations of virtual objects can be placed into the three-dimensional map to generate a specific test scenario (e.g., such as an animal entering the travelway). The additional mesh representations of virtual objects can be static or can move in the environment over time (e.g., to simulate the animal entering the travelway). Thus, a particular scenario in which testing is sought can be built by adding various elements to and/or otherwise modifying the base three-dimensional map (e.g., with aspects of the modified map changing over time).

Having obtained a three-dimensional map of the environment relative to which the simulation is desired, the computing system can determine a trajectory to be used for the simulation. The trajectory can describe a series of locations of a virtual object relative to the environment over time. The trajectory can be a stationary trajectory or a non-stationary trajectory. In some implementations, the trajectory can be determined based on a user input (e.g., a user input that describes a two-dimensional trajectory through the environment such as per a top-down view). The trajectory can, in some implementations, include information about velocity, acceleration, vehicle pose, and/or other motion characteristics or parameters. More generally, the trajectory can describe how a simulated, virtual LiDAR system is moving relative to the environment when the data to be simulated is "collected".

The computing system can perform ray casting on the three-dimensional map according to the trajectory to generate an initial three-dimensional point cloud that comprises a plurality of points. As one example, a graphics-based ray casting engine can be given the trajectory (e.g., in the form of a desired sensor 6-degrees of freedom pose and velocity). The engine can cast a set of ray casting rays from the simulated, virtual LiDAR system into the environment.

In some implementations, the computing system can account for the rotary motion of the virtual LiDAR system (also known as "rolling shutter effects") by compensating for motion of the virtual system along the trajectory during the simulated LiDAR sweep. In particular, performing the ray casting can include determining, for each of a plurality of rays, a ray casting location and a ray casting direction based at least in part on the trajectory.

The computing system (e.g., the ray casting engine) can provide at least a respective depth for each of the plurality of points in the initial three-dimensional point cloud. As one example, performing the ray casting to generate the initial three-dimensional point cloud can include, for each of the plurality of rays: identifying a closest surface element in the three-dimensional map to the ray casting location and along the ray casting direction and generating one of the plurality of points with its respective depth based at least in part on a distance from the ray casting location to the closest surface element.

After using the physics-based approach to obtain the initial three-dimensional point cloud, the computing system can use a machine-learned geometry network to process the initial three-dimensional point cloud to predict a respective adjusted depth for one or more of the plurality of points. For example, the computing system can input the initial three-dimensional point cloud into the machine-learned geometry network and, in response, the machine-learned geometry network can provide the one or more adjusted depths for the one or more of the plurality of points as an output. In one example, the machine-learned geometry network can be a parametric continuous convolution neural network.

The computing system can generate an adjusted three-dimensional point cloud in which the one or more of the plurality of points have the respective adjusted depth predicted by the machine-learned geometry network. For example, the computing system can separately generate the adjusted three-dimensional point cloud based on an output of the geometry model or, in other implementations, the adjusted three-dimensional point cloud can be directly output by the geometry model.

In some implementations, the computing system can also generate intensity data for each point in the initial three-dimensional point cloud or the adjusted three-dimensional point cloud. For example, for each of such points, the computing system can determine a respective intensity value based at least in part on intensity data included in the three-dimensional map for locations within a radius of a respective location associated with such point in either the initial three-dimensional point cloud or the adjusted three-dimensional point cloud. For example, the average intensity in this local radius can be assigned to the point.

In such fashion, the systems and methods enable the efficient and accurate generation of synthetic—yet realistic—LiDAR data. The ability to generate such synthetic LiDAR data has a number of benefits, including, for example, the ability to test/train autonomous vehicle systems on the synthetic LiDAR data. In particular, LiDAR data can be synthesized for challenging edge cases which can enable more robust testing/training of autonomous vehicle systems, thereby leading to autonomous vehicles which demonstrate improved safety, efficiency, and/or other performance measures.

In one example, the adjusted three-dimensional point cloud (e.g., including the intensity data) can be fed as LiDAR data input to an autonomy computing system of an autonomous vehicle (e.g., a perception system thereof) to test a performance of the autonomy computing system of the autonomous vehicle in the environment. In another example, the LiDAR data synthesis systems described herein can be interoperate with an autonomous vehicle computing system in a continuous feedback loop in which motion controls output by the autonomous vehicle computing system in response to synthetic LiDAR data are used to guide the process of generating additional synthetic LiDAR data, and so on in a continuous testing loop (thus, in some implementations, the trajectory can be determined in real-time based on communication with the autonomous vehicle computing system).

Aspects of the present disclosure are also directed to techniques for training the machine-learned geometry model described herein. In one example, the machine-learned geometry model can be trained using an objective function that includes a reconstruction loss term that measures respective distances between points included in a synthetic three-dimensional point cloud generated using the machine-learned geometry model and points included in a ground truth three-dimensional point cloud collected by a physical LiDAR system. Additionally or alternatively, the objective function can include an adversarial loss term that measures an ability of a discriminator network to select which of a synthetic three-dimensional point cloud generated using the machine-learned geometry model and a ground truth three-dimensional point cloud collected by a physical LiDAR system is real and which is synthetic.

The systems and methods of the present disclosure provide a number of technical effects and benefits. As one example, the systems and methods of the present disclosure enable the generation of synthetic LiDAR with improved realism versus purely physics-based approaches. As another example, the systems and methods of the present disclosure enable the generation of synthetic LiDAR with significantly less usage of computing resources (e.g., memory usage, processor usage, etc.) versus purely learning-based approaches. As yet another example, the systems and methods of the present disclosure enable the generation of synthetic LiDAR which can be used to test and develop autonomous vehicle computing system in a much more efficient fashion. In particular, rather than needing to physically operate a vehicle to experiment with vehicle performance in an edge case, the LiDAR for the desired scenario can simply be synthesized and used to train the appropriate systems, thereby conserving testing resources such as vehicle operational time, fuel, etc. and speeding the developmental cycle.

With reference now to the Figures, example embodiments of the present disclosure will be discussed in further detail.

Example Computing System

FIG. 1 depicts a block diagram of an example computing system 100 according to example embodiments of the present disclosure. The example system 100 includes a LiDAR synthesis computing system 102 and a machine learning computing system 130 that are communicatively coupled over a network 180. In some implementations, one or more autonomous vehicle computing systems 190 can be communicatively coupled to the network 180 as well. Example autonomous vehicle computing systems 190 are described with reference to FIGS. 8 and 9.

Referring still to FIG. 1, in some implementations, the LiDAR synthesis computing system 102 can generate synthetic LiDAR data. In some implementations, the LiDAR synthesis computing system 102 can be included in an autonomous vehicle. For example, the LiDAR synthesis computing system 102 can be on-board the autonomous vehicle. In other implementations, the LiDAR synthesis computing system 102 is not located on-board the autonomous vehicle. For example, the LiDAR synthesis computing system 102 can operate offline. The LiDAR synthesis computing system 102 can include one or more distinct physical computing devices.

The LiDAR synthesis computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the LiDAR synthesis computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein.

Figure 2:
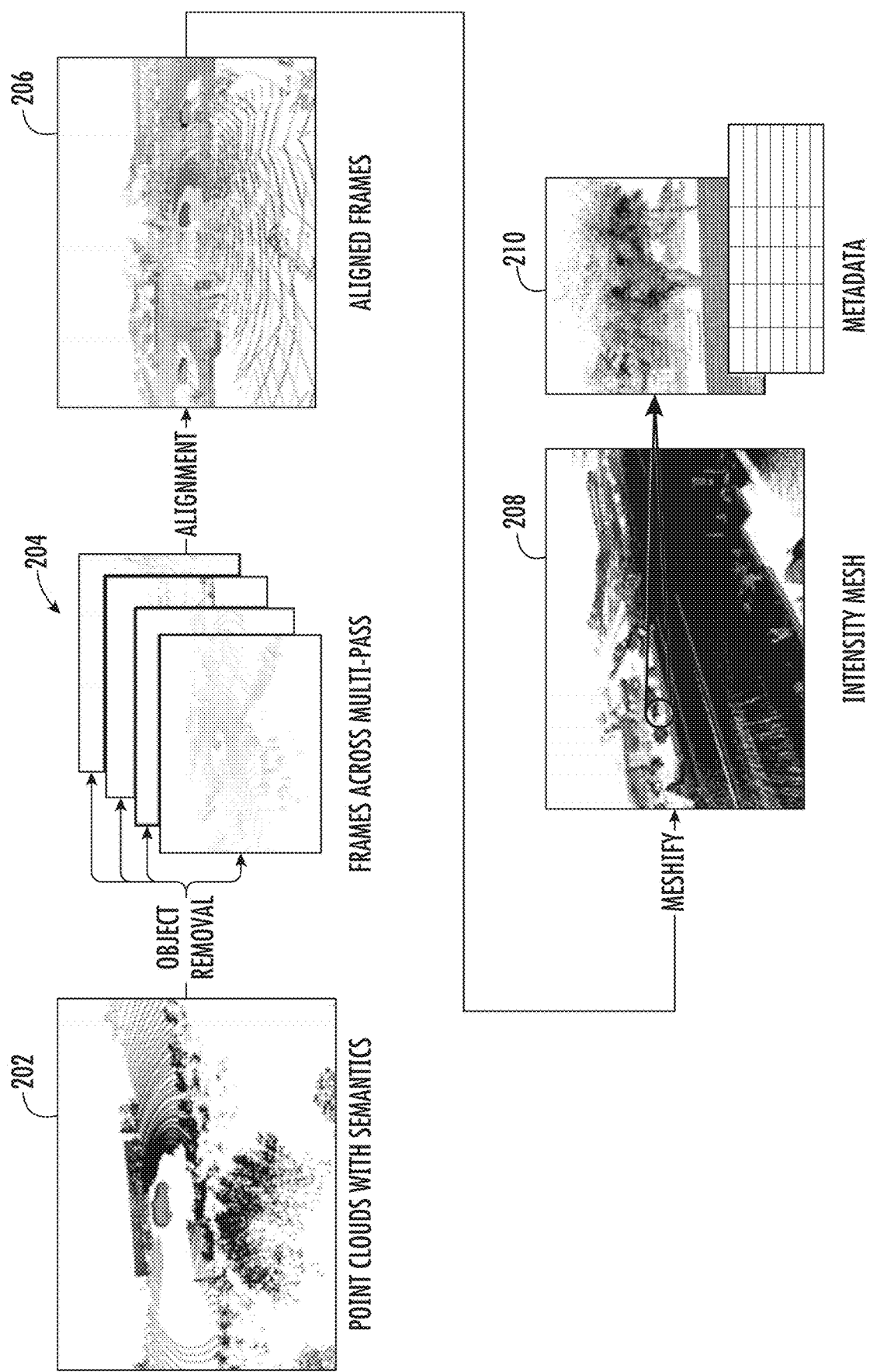
FIG. 2 depicts a graphical diagram of an example process to generate a three-dimensional map of an environment according to example embodiments of the present disclosure.

The LiDAR synthesis computing system 102 can store or include one or more three-dimensional maps 104. The maps 104 can be generated, for example, based on real-world LiDAR data collected at various real-world locations. One example process for generating the three-dimensional maps 104 is illustrated in FIG. 2.

Referring still to FIG. 1, the LiDAR synthesis computing system 102 can also include one or more physics-based engines 106. In some implementations, the physics-based engines 106 can be configured to perform ray casting. In some implementations, the physics-based engines 106 can include or provide a rendering engine ("renderer") for 2D or 3D graphics, collision detection (and collision response), sound, scripting, animation, artificial intelligence, networking, streaming, memory management, threading, localization support, scene graph, and may include video support for cinematics. Example physics-based engines 106 include the Unreal engine and the Intel Embree engine.

The LiDAR synthesis computing system can include an intensity determination system 108. The intensity determination system 108 can determine an intensity for each point in a three-dimensional point cloud (e.g., an initial point cloud and/or an adjusted point cloud). The intensity determination system 108 can use metadata included in the three-dimensional maps 104 to determine the intensity data. The intensity determination system 108 can be implemented in hardware, firmware, and/or software controlling one or more processors.

According to an aspect of the present disclosure, the LiDAR synthesis computing system 102 can store or include one or more machine-learned models 110. For example, the models 110 can be or can otherwise include various machine-learned models such as support vector machines, neural networks (e.g., deep neural networks), or other multi-layer non-linear models. Example neural networks include feed-forward neural networks, recurrent neural networks (e.g., long short-term memory recurrent neural networks), convolutional neural networks, or other forms of neural networks. One example type of convolutional neural network is a parametric continuous convolution neural network. Example parametric continuous convolution neural networks are described in U.S. patent application Ser. No. 16/175,161 filed Oct. 30, 2018, which is hereby incorporated by reference herein.

In some implementations, the LiDAR synthesis computing system 102 can receive the one or more machine-learned models 110 from the machine learning computing system 130 over network 180 and can store the one or more machine-learned models 110 in the memory 114. The LiDAR synthesis computing system 102 can then use or otherwise implement the one or more machine-learned models 110 (e.g., by processor(s) 112).

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the model(s) 110 at the LiDAR synthesis computing system 102, the machine learning computing system 130 can include one or more machine-learned models 140. For example, the models 140 can be or can otherwise include various machine-learned models such as support vector machines, neural networks (e.g., deep neural networks), or other multi-layer non-linear models. Example neural networks include feed-forward neural networks, recurrent neural networks (e.g., long short-term memory recurrent neural networks), convolutional neural networks (e.g., parametric continuous convolution networks), or other forms of neural networks.

As an example, the machine learning computing system 130 can communicate with the LiDAR synthesis computing system 102 according to a client-server relationship. For example, the machine learning computing system 140 can implement the machine-learned models 140 to provide a web service to the LiDAR synthesis computing system 102. For example, the web service can provide a data synthesis service.

Thus, machine-learned models 110 can located and used at the LiDAR synthesis computing system 102 and/or machine-learned models 140 can be located and used at the machine learning computing system 130.

In some implementations, the machine learning computing system 130 and/or the LiDAR synthesis computing system 102 can train the machine-learned models 110 and/or 140 through use of a model trainer 160. The model trainer 160 can train the machine-learned models 110 and/or 140 using one or more training or learning algorithms. One example training technique is backwards propagation of errors. In some implementations, the model trainer 160 can perform supervised training techniques using a set of labeled training data. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques.

In particular, the model trainer 160 can train a machine-learned model 110 and/or 140 based on a set of training data 162. The training data 162 can include, for example, sets of LiDAR data that were physically collected at various known locations. The model trainer 160 can be implemented in hardware, firmware, and/or software controlling one or more processors.

The LiDAR synthesis computing system 102 can also include a network interface 124 used to communicate with one or more systems or devices, including systems or devices that are remotely located from the LiDAR synthesis computing system 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the machine learning computing system 130 can include a network interface 164.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 1 illustrates one example computing system 100 that can be used to implement the present disclosure. Other computing systems can be used as well. For example, in some implementations, the LiDAR synthesis computing system 102 can include the model trainer 160 and the training dataset 162. In such implementations, the machine-learned models 110 can be both trained and used locally at the LiDAR synthesis computing system 102. As another example, in some implementations, the LiDAR synthesis computing system 102 is not connected to other computing systems.

In addition, components illustrated and/or discussed as being included in one of the computing systems 102 or 130 can instead be included in another of the computing systems 102 or 130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Example Process for Generating Three-Dimensional Maps

FIG. 2 depicts a graphical diagram of an example process to generate a three-dimensional map of an environment according to example embodiments of the present disclosure. In particular, in order to simulate real-world scenes, a computing system can first utilize sensor data scans to build a representation of the three-dimensional world.

First, real-world LiDAR data (e.g., shown as point clouds with semantics 202) can be collected by driving over the same scene multiple times using multiple sensors under diverse environmental conditions such as weather and time of the day.

Next, the computing system can remove moving objects (e.g., vehicles, cyclists, pedestrians) automatically by exploiting a LiDAR segmentation algorithm. One example segmentation algorithm is described in C. Zhang, W. Luo, and R. Urtasun. Efficient convolutions for real-time semantic segmentation of 3d point clouds. In 3DV, 2018. The result is shown, for example, as frames across multi-pass 204.

The multiple LiDAR sweeps 204 can then be associated to a common coordinate system (e.g., referred to as map-relative frame) using, for example, offline Graph-SLAM with multi-sensory fusion. This provides centimeter level dense alignments of multiple LiDAR sweeps (e.g., shown as aligned frames 206). Without effective segmentation, the resulting maps will contain multiple instances of the same moving object.

Next, the aggregated LiDAR point cloud 206 from multiple drives can be converted into a surfel-based 3D mesh 208 of the scene (e.g., through voxel-based downsampling and normal estimation). In particular, in one example, all the points are bucketed into voxels (e.g., of size 5×5×5 $cm^3$) and each occupied voxel returns exactly one point by averaging all the points inside it.

For each point, normal estimation can be conducted through principal components analysis over neighboring points. The surfel-based representation 208 can be used due to its simple construction, effective occlusion reasoning, and efficient collision checking. To be precise, in some implementations, each surfel can be generated from a single point.

In addition to geometric information, the computing system can record sensory metadata 210 for each surfel to be used for intensity simulation. This can include, among other information, the incidence angle, raw intensity, transmitted power level, range value as well as a unique ID per beam.

Example Process for Generating Synthetic LiDAR Data

Figure 3:
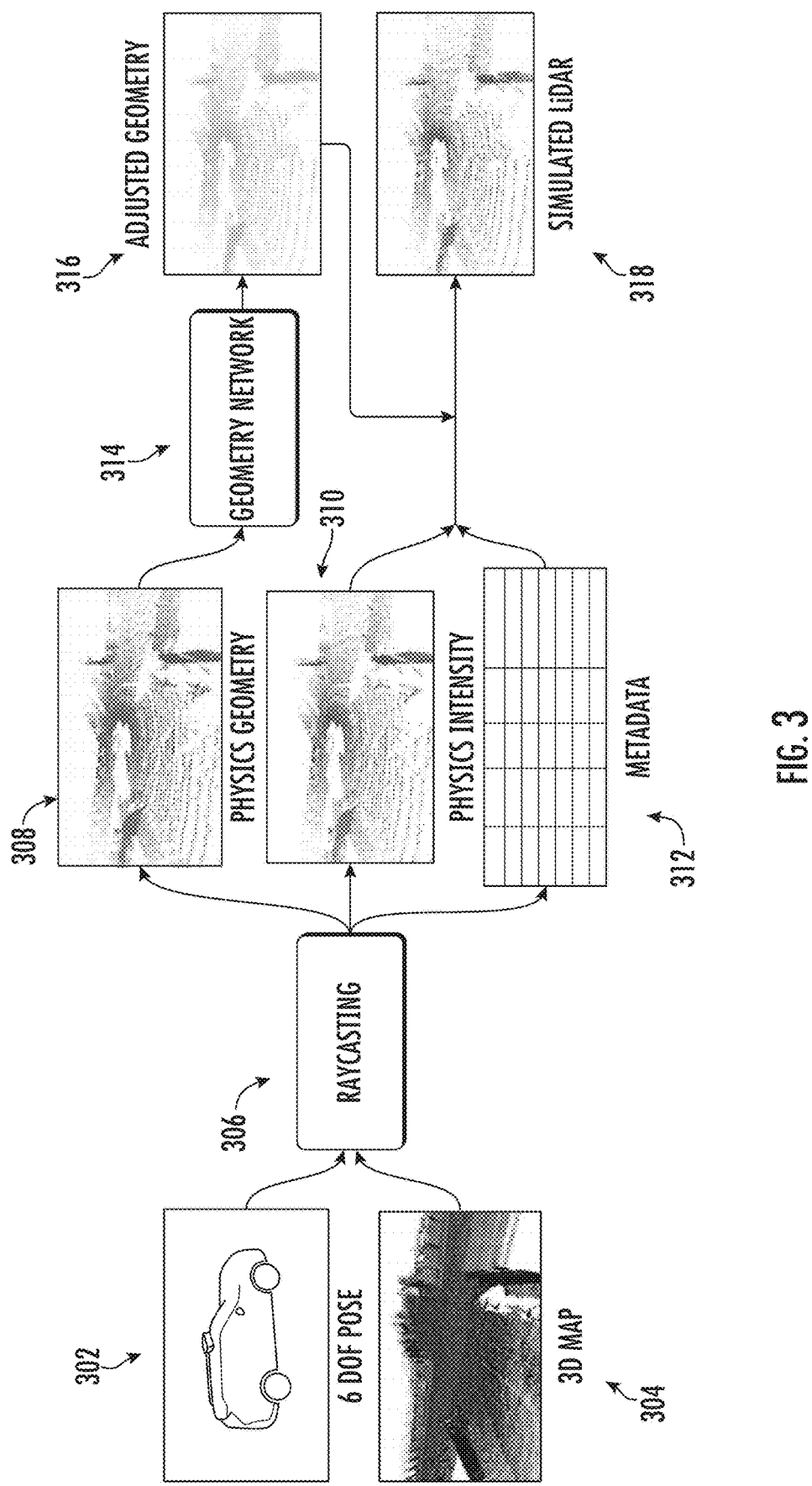
FIG. 3 depicts a graphical diagram of an example process to generate synthetic LiDAR data according to example embodiments of the present disclosure.

FIG. 3 depicts a graphical diagram of an example process to generate synthetic LiDAR data according to example embodiments of the present disclosure. In particular, the illustrated approach exploits physics based simulation to create a rough estimation of the geometry and intensity of the generated point cloud.

The illustrated process focuses on simulating a scanning LiDAR system. One example system that can be simulated has 64 emitter-detector pairs vertically arranged, each of which uses light pulses to measure distance. The basic concept is that each emitter emits a light pulse which travels until it hits a target, and a portion of the light energy is reflected back and received by the detector. Distance is measured by calculating the time of travel and material reflectance is measured through the intensity of the returned pulse. The entire optical assembly rotates on a base to provide a 360-degree azimuth field of view at around 10 Hz with each full "sweep" providing approximately 70 k returns.

Referring to FIG. 3, given a 6-degree of freedom (DOF) pose 302 and a three-dimensional map 304 (e.g., generated according to process shown in FIG. 2), the process illustrated in FIG. 3 can simulate a LiDAR sensor with a graphics-based raycasting engine 306 and a machine-learned model 314.

In particular, based on the simulated LiDAR sensor's intrinsic parameters, a set of raycasting rays can be shot by a raycasting engine 306 from the virtual LiDAR center into the scene. The rolling shutter effects of the virtual sensor can be simulated by compensating for the ego-car's relative motion during the LiDAR sweep.

Figure 4:
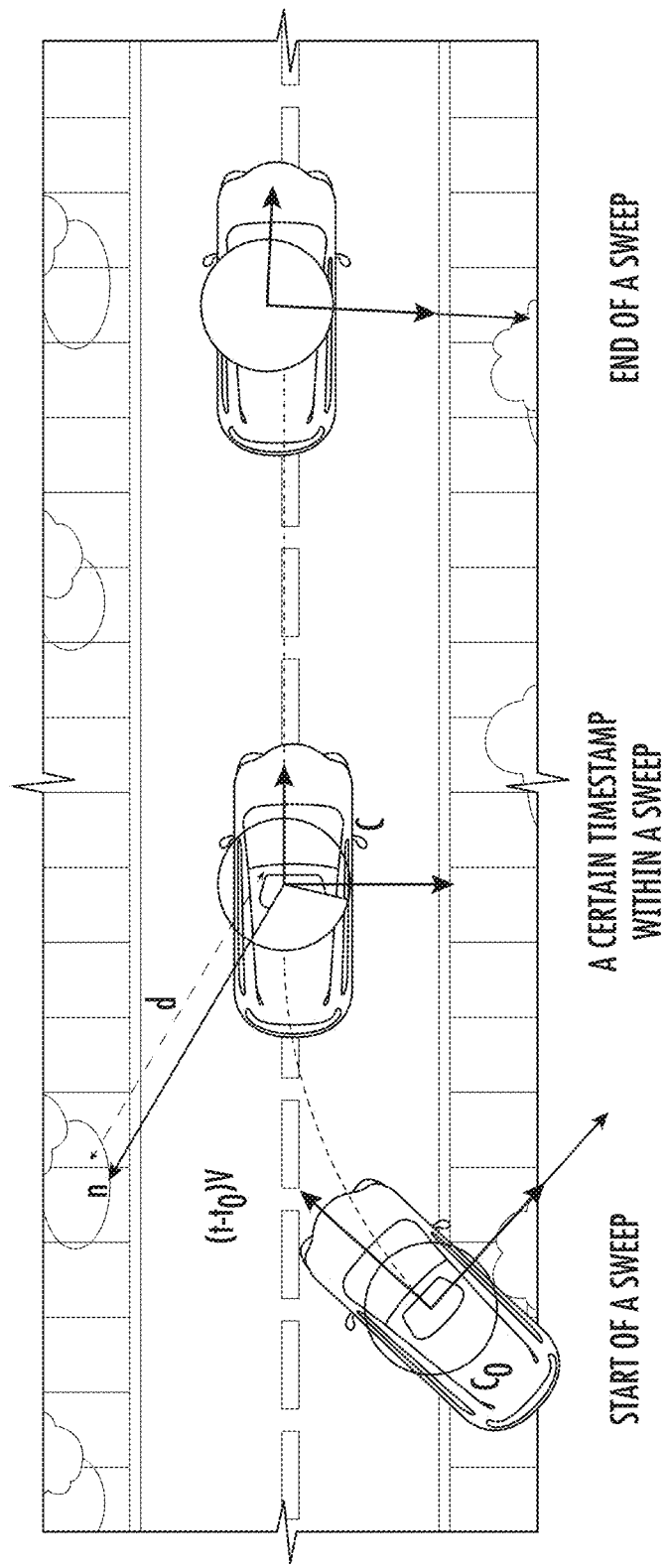
FIG. 4 depicts a graphical diagram of an example trajectory of a virtual object according to example embodiments of the present disclosure.

As an example, FIG. 4 illustrates a graphical diagram of an example trajectory of a virtual object according to example embodiments of the present disclosure. In particular, FIG. 4 illustrates rendering performed with a rolling shutter effect.

In particular, in some implementations, for each ray shot from the LiDAR sensor at a vertical angle θ and horizontal angle ϕ the ray can be represented with the source location (c and shooting direction n):

$$c = c_0 + (t_1 - t_0)v_0, \quad n = R_0 \begin{bmatrix} \cos\theta & \cos\phi \\ \cos\theta & \sin\phi \\ \sin\theta \end{bmatrix}$$

where $c_0$ is the sensor 3D location and $R_0$ is the 3D rotation at the beginning of the sweep with respect to the map coordinate. $v_0$ is the velocity and $t_1-t_0$ is the change in time of the simulated LiDAR rays. A respective depth d can be determined for each casted ray.

Referring again to FIG. 3, in one example the raycasting engine 306 is the Intel Embree raycasting engine and is used to obtain the depth returns of the rays. To be specific, in some implementations, for each ray the engine uses the MllerTrumbore intersection algorithm to compute the ray-triangle collision against all the surfels in the scene and finds the surfel closest to the sensor and returns the range value d. A map-relative location is can then be decided and converted back to sensor-relative frame as the returned LiDAR point:

$$x = R_0^T(c + dn - c_0)$$

Applying this to all rays in the LiDAR sensor sweep, the computing system can obtain a physics-generated point cloud $\mathcal{P}=\{x_i\}$ over the constructed scene (e.g., shown as physics geometry 308). To accurately compare real-world LiDAR vs. simulated LiDAR on point-by-point level, the computing system can use the orientation of ground-truth LiDAR rays as input to the raycasting engine 306. If during raycasting a ray does not produce a return due to mesh holes/differences, the computing system can find its nearest neighbor in cartesian space that did produce a return and use the range value returned from this successful neighbor.

The intensity value of a point is influenced by many factors including incidence angle, range, and the beam bias. The computing system can employ nearest neighbors as the estimator for intensity. To be specific, for each returned ray, the computing system can conduct a nearest neighbor search within a small radius of the hitted surfel where reflectance of the local surface is assumed to be the same. Note that this assumption might not hold true along geometric boundaries or material boundary over the same object. The computing system can then assign the average intensity in this local radius as our target intensity value (e.g., shown as physics intensity 310 generated from metadata 312).

To simulate a new viewpoint, the computing system can exploit a combination of a physics-based rendering and a deep neural network 314 that modifies the rendered point clouds to augment their realism. This is a very powerful combination as learning from scratch is very hard and physics-based rendering has many artifacts. These artifacts exist because meshes created from real-world scans are not geometrically perfect. Meshes built from real world scans can contain holes and errors in position and computed normals due to sensor noise, errors in localization, and errors in segmentation (of dynamic objects). Furthermore, the intensity returns vary significantly due to beam bias, external factors such as temperature and humidity as well as black box normalization procedures that are done by the LiDAR provider.

To account and correct the aforementioned limitations in raycasted LiDAR 308, the illustrated process can include application of machine learning to bridge the gap between simulated and real-world LiDAR data. The main architecture is a geometry network 314 that aims at improving the geometry of the simulated point cloud 308.

The geometry network 314 aims at improving the initial LiDAR point cloud 308 produced from raycasting to be perceptually similar to real LiDAR sensor data.

In some implementations, the neural network's input is the initial LiDAR point cloud 308 in sensor polar coordinates. Each LiDAR point can be described with (ϕ, θ, d) where ϕ is the sensor angle (yaw), θ is the laser pitch, and d is the depth value of the returned LiDAR point.

The output 316 of the network 314 is the adjusted depth per point. This output representation ensures the resulting point cloud is physically feasible (e.g., rays do not intersect, rays do not have multiple returns, no impossible geometries created, etc.). In one example, the geometry network 314 can include a parametric continuous convolution network as its backbone architecture. This is a powerful deep learning architecture that works directly on unstructured point cloud data without voxelization or rasterization, thereby maintaining high fidelity of the input geometry. Moreover, similar to CNNs for images, continuous convolutions capture the contextual relationship between a point and its neighbors in a bottom-up manner.

As one particular example, the geometry network 314 can include four layers of continuous fusion, a memory-efficient variant of the continuous convolution layer with residual connections between each adjacent layer. The k-nearest neighbors per point $p_i$ can be computed based on a Mahalanobis distance $d_i=\sqrt{(p-p^i)^T S^{-1}(p-p_i)}$ where $p=(\phi, \theta, d/d_{max})$ is polar coordinate with a normalized depth and S is diagonal reweighting matrix.

In some implementations, the adjusted geometry 316 can be combined with the intensity data 310 to generate a set of simulated LiDAR 318 which reflects both the adjusted depths and the determined intensity. For example, the respective intensity data can be assigned to each point in the adjusted geometry 316 to generate the simulated LiDAR data 318.

In some implementations, the intensity data 310 can be updated based on the adjusted depth(s). For example, for each point that has had its depth adjusted, the computing system can determine a new set of intensity data (e.g., using the metadata 312) based on its adjusted depth. For example, the neighborhood analysis described above can be performed given the point's new depth. In other implementations, the intensity data 310 is not computed at all until after the adjusted geometry 316 has been determined. Thus, the intensity data 310 can be computed at the time of ray casting 306 and left unmodified; computed at the time of ray casting 306 and then modified to account for the adjusted depths; or computed only for the adjusted geometry 316 following adjustment of the depths.

In some implementations, the geometry network 314 can be trained using adversarial learning. For example, in some implementations, training can include two stages: the first stage can train the geometry network in an adversarial setting to improve the geometry of the simulated point cloud. In some implementations, the training can be designed such that the simulated LiDAR should (i) accurately represent the scene (ii) be perceptually similar to real world LiDAR. Both factors can be incorporated by employing a combination of a geometric loss and a reconstruction loss. Thus, one example objective function can be defined as:

$$w_g = \arg\min_{w_g} \{\ell_1(w_g) + \max_{w_d} \ell_{GAN}(w_g, w_d)\} \quad (1)$$

As one example reconstruction loss, the average of $\ell_1$ distance between the simulated and real LiDAR range values can be used, as follows:

$$\ell_1(w_g) = \mathbb{E}_{x,y}[\|y - g(x; w_g)\|_1] \quad (2)$$

where $g(\bullet; w_g)$ is the geometry network, x is the ray-casted point cloud, i.e., the input of the geometry network, and y is the true point cloud, i.e. the ideal output. However, in some implementations, a GAN-loss can be incorporated to boost the perceptual quality: the geometry network 314 can generate estimated range adjustments of the LiDAR point cloud, while the discriminator must distinguish between the adjusted LiDAR point cloud and its respective real-LiDAR point cloud.

More formally, we have:

$$\ell_{GAN}(w_g, w_d) = \mathbb{E}_y[\log d(y_{gt}; w_g)] + \mathbb{E}_x[\log(1 - d(g(x; w_g)))] \quad (3)$$

where $d(\bullet; w_g)$ is the discriminator network. As one example, the discriminator network can be a two-layer continuous convolution network with a softmax layer that classifies each point in the point cloud as either simulated or real. The discriminator and generator can be optimized using stochastic gradient descent in alternation.

Example Methods

Figure 5:
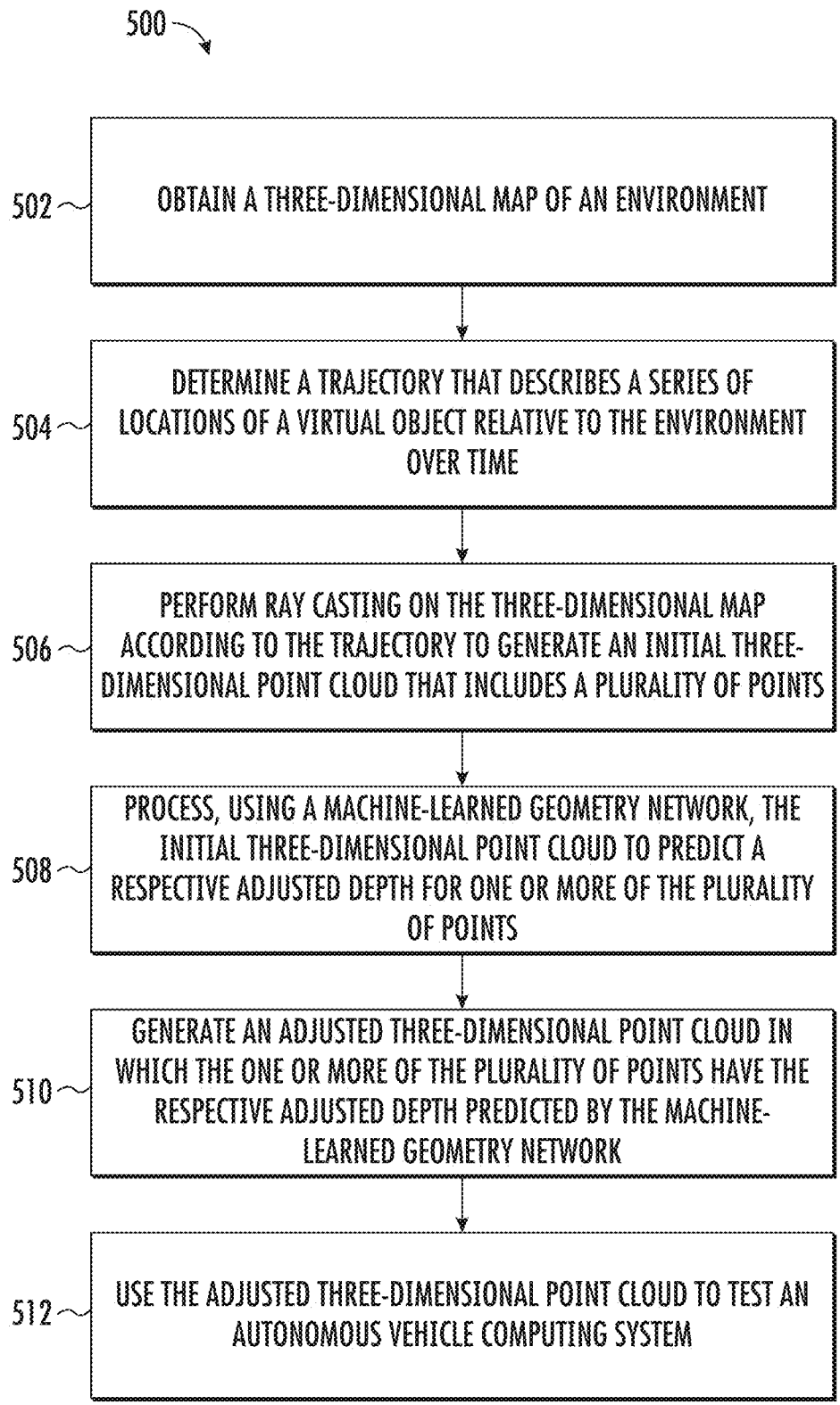
FIG. 5 depicts a flow chart diagram of an example method to generate synthetic LiDAR data according to example embodiments of the present disclosure.

FIG. 5 depicts a flow chart diagram of an example method 500 to generate synthetic LiDAR data according to example embodiments of the present disclosure.

At 502, a computing system can obtain a three-dimensional map of an environment. The three-dimensional map can be any type of map that can be used by a physics-based approach to generate an initial three-dimensional point cloud that simulates LiDAR data captured within the environment. As one example, the three-dimensional map can be a map that includes a plurality of surface elements (which may, in some instances, be referred to as "surfels") that indicate the respective surfaces of various objects (e.g., buildings, road surfaces, curbs, trees, etc.) within the environment. Metadata such as surface normal and/or other surface information can be associated with each surface element.

In some implementations, at 502, the computing system can generate the three-dimensional map of the environment from a set of previous LiDAR scans that were performed at such environment. The map can be generated at the time at which the synthetic LiDAR data is desired or can be pre-generated (e.g., as a batch), stored in memory, and then later accessed or otherwise obtained to assist in generating the synthetic LiDAR data. Thus, in some implementations, to generate a three-dimensional map of an environment, the computing system can first obtain a plurality of sets of real-world LiDAR data physically collected by one or more LiDAR systems in the environment. For example, these sets of real-world LiDAR data can have been collected by autonomous vehicles and/or non-autonomous vehicles as they traveled through the environment.

In some implementations, the computing system can remove one or more moving objects from the plurality of sets of real-world LiDAR data. In some implementations, one or more segmentation algorithms can be performed to assign a semantic class (e.g., pedestrian, street sign, tree, curb, etc.) to each point (or group of points) in each set of real-world LiDAR data. Points that have been assigned to semantic classes that are non-stationary (e.g., vehicle, bicyclist, pedestrian, etc.) can be removed from the real-world LiDAR point clouds.

The computing system can associate the plurality of sets of real-world LiDAR data to a common coordinate system to generate an aggregate LiDAR point cloud. For example, each set of LiDAR data can be transitioned from respective vehicle coordinate system to a common coordinate system based on a respective pose (e.g., location and orientation) of the vehicle at the time of data collection.

The computing system can convert the aggregate LiDAR point cloud to a surface element-based three-dimensional mesh. For example, the computing system can perform voxel-based downsampling and normal estimation to perform the conversion. In addition to the geometric information, sensory metadata (e.g., incidence angle, raw intensity, transmitted power level, range value, unique ID per beam, etc.) can be recorded for each surface element (e.g., to be used for intensity simulation).

In some implementations, additional mesh representations of virtual objects can be placed into the three-dimensional map to generate a specific test scenario (e.g., such as an animal entering the travelway). The additional mesh representations of virtual objects can be static or can move in the environment over time (e.g., to simulate the animal entering the travelway). Thus, a particular scenario in which testing is sought can be built by adding various elements to and/or otherwise modifying the base three-dimensional map (e.g., with aspects of the modified map changing over time).

At 504, the computing system can determine a trajectory that describes a series of location of a virtual object relative to the environment over time. The trajectory can describe a series of locations of a virtual object relative to the environment over time. The trajectory can be a stationary trajectory or a non-stationary trajectory. In some implementations, the trajectory can be determined based on a user input (e.g., a user input that describes a two-dimensional trajectory through the environment such as per a top-down view). The trajectory can, in some implementations, include information about velocity, acceleration, vehicle pose, and/ or other motion characteristics or parameters. More generally, the trajectory can describe how a simulated, virtual LiDAR system is moving relative to the environment when the data to be simulated is "collected".

At 506, the computing system can perform ray casting on the three-dimensional map according to the trajectory to generate an initial three-dimensional point cloud that includes a plurality of points. As one example, a graphics-based ray casting engine can be given the trajectory (e.g., in the form of a desired sensor 6-degrees of freedom pose and velocity). The engine can cast a set of ray casting rays from the simulated, virtual LiDAR system into the environment.

In some implementations, the computing system can account for the rotary motion of the virtual LiDAR system (also known as "rolling shutter effects") by compensating for motion of the virtual system along the trajectory during the simulated LiDAR sweep. In particular, performing the ray casting can include determining, for each of a plurality of rays, a ray casting location and a ray casting direction based at least in part on the trajectory.

The computing system (e.g., the ray casting engine) can provide at least a respective depth for each of the plurality of points in the initial three-dimensional point cloud. As one example, performing the ray casting to generate the initial three-dimensional point cloud can include, for each of the plurality of rays: identifying a closest surface element in the three-dimensional map to the ray casting location and along the ray casting direction and generating one of the plurality of points with its respective depth based at least in part on a distance from the ray casting location to the closest surface element.

At 508, the computing system can process, using a machine-learned geometry network, the initial three-dimensional point cloud to predict a respective adjusted depth for one or more of the plurality of points. For example, the computing system can input the initial three-dimensional point cloud into the machine-learned geometry network and, in response, the machine-learned geometry network can provide the one or more adjusted depths for the one or more of the plurality of points as an output. In one example, the machine-learned geometry network can be a parametric continuous convolution neural network.

At 510, the computing system can generate an adjusted three-dimensional point cloud in which the one or more of the plurality of points have the respective adjusted depth predicted by the machine-learned geometry network. For example, the computing system can separately generate the adjusted three-dimensional point cloud based on an output of the geometry model or, in other implementations, the adjusted three-dimensional point cloud can be directly output by the geometry model.

In some implementations, the computing system can also generate intensity data for each point in the initial three-dimensional point cloud or the adjusted three-dimensional point cloud. For example, for each of such points, the computing system can determine a respective intensity value based at least in part on intensity data included in the three-dimensional map for locations within a radius of a respective location associated with such point in either the initial three-dimensional point cloud or the adjusted three-dimensional point cloud. For example, the average intensity in this local radius can be assigned to the point.

At 512, the computing system can use the adjusted three-dimensional point cloud to test an autonomous vehicle computing system. In one example, the adjusted three-dimensional point cloud (e.g., including the intensity data) can be fed as LiDAR data input to an autonomy computing system of an autonomous vehicle (e.g., a perception system thereof) to test a performance of the autonomy computing system of the autonomous vehicle in the environment. In another example, the LiDAR data synthesis systems described herein can be interoperate with an autonomous vehicle computing system in a continuous feedback loop in which motion controls output by the autonomous vehicle computing system in response to synthetic LiDAR data are used to guide the process of generating additional synthetic LiDAR data, and so on in a continuous testing loop (thus, in some implementations, the trajectory can be determined in real-time based on communication with the autonomous vehicle computing system).

Figure 6:
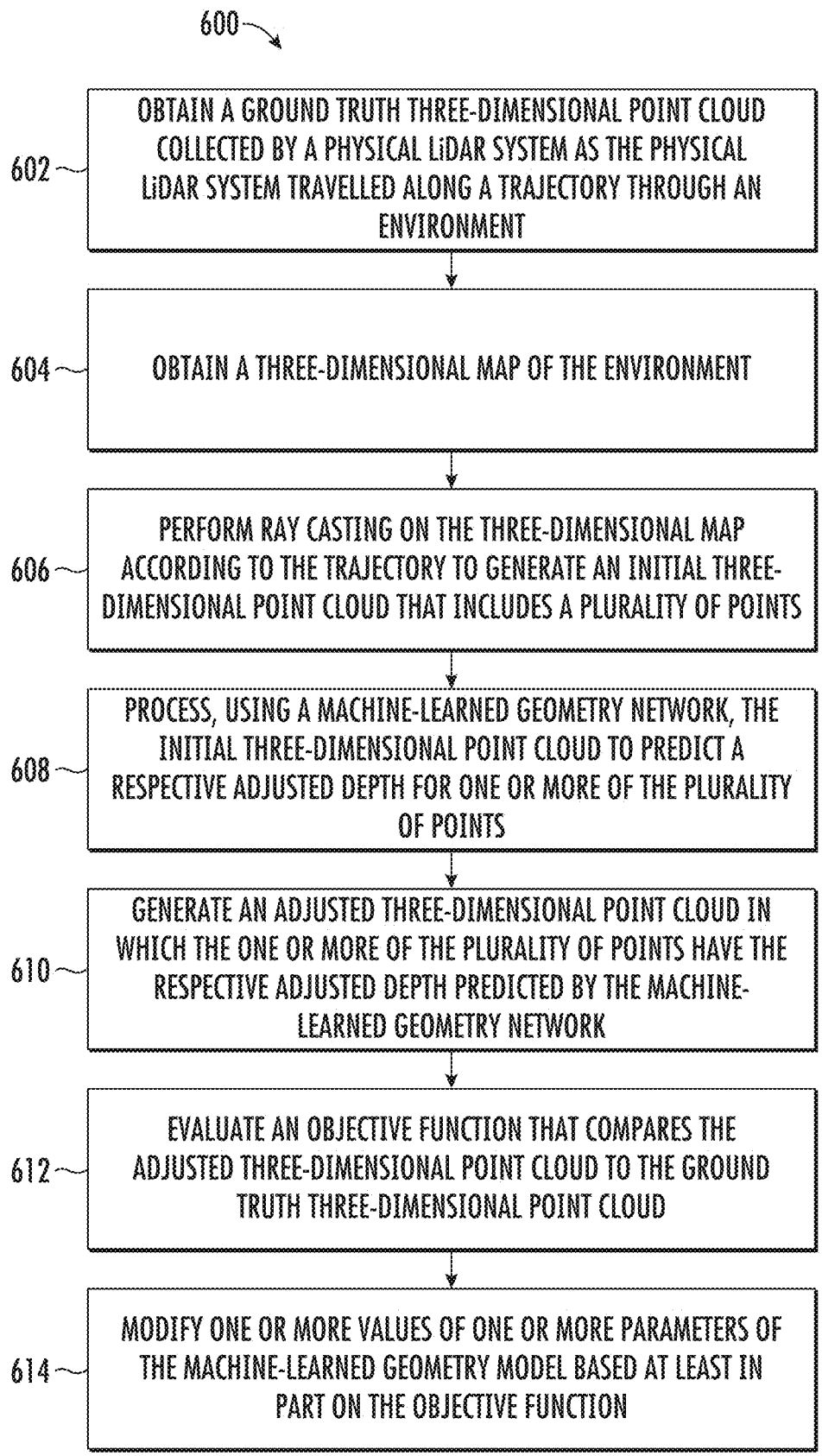
FIG. 6 depicts a flow chart diagram of an example method to train a machine-learned geometry model according to example embodiments of the present disclosure.

FIG. 6 depicts a flow chart diagram of an example method 600 to train a machine-learned geometry model according to example embodiments of the present disclosure.

At 602, a computing system can obtain a ground truth three-dimensional point cloud collected by a physical LiDAR system as the physical LiDAR system travelled along a trajectory through an environment. At 604, the computing system can obtain a three-dimensional map of the environment. In some instances, the three-dimensional map can be generated based at least in part on the ground truth three-dimensional point cloud.

At 606, the computing system can perform ray casting on the three-dimensional map according to the trajectory to generate an initial three-dimensional point cloud that includes a plurality of points. At 608, the computing system can process, using a machine-learned geometry network, the initial three-dimensional point cloud to predict a respective adjusted depth for one or more of the plurality of points. At 610, the computing system can generate an adjusted three-dimensional point cloud in which the one or more of the plurality of points have the respective adjusted depth predicted by the machine-learned geometry network.

At 612, the computing system can evaluate an objective function that compares the adjusted three-dimensional point cloud to the ground truth three-dimensional point cloud. For example, in some implementations, the machine-learned geometry model can be trained using an objective function that includes a reconstruction loss term that measures respective distances between points included in a synthetic three-dimensional point cloud generated using the machine-learned geometry model and points included in a ground truth three-dimensional point cloud collected by a physical LiDAR system.

Additionally or alternatively, the objective function evaluated at 612 can include an adversarial loss term that measures an ability of a discriminator network to select which of a synthetic three-dimensional point cloud generated using the machine-learned geometry model and a ground truth three-dimensional point cloud collected by a physical LiDAR system is real and which is synthetic.

At 614, the computing system can modify one or more values of one or more parameters of the machine-learned geometry model based at least in part on the objective function. For example, the objective function can be back-propagated through the geometry network and the values of the parameters can be updated based on a gradient of the objective function.

Example Means

Figure 7:
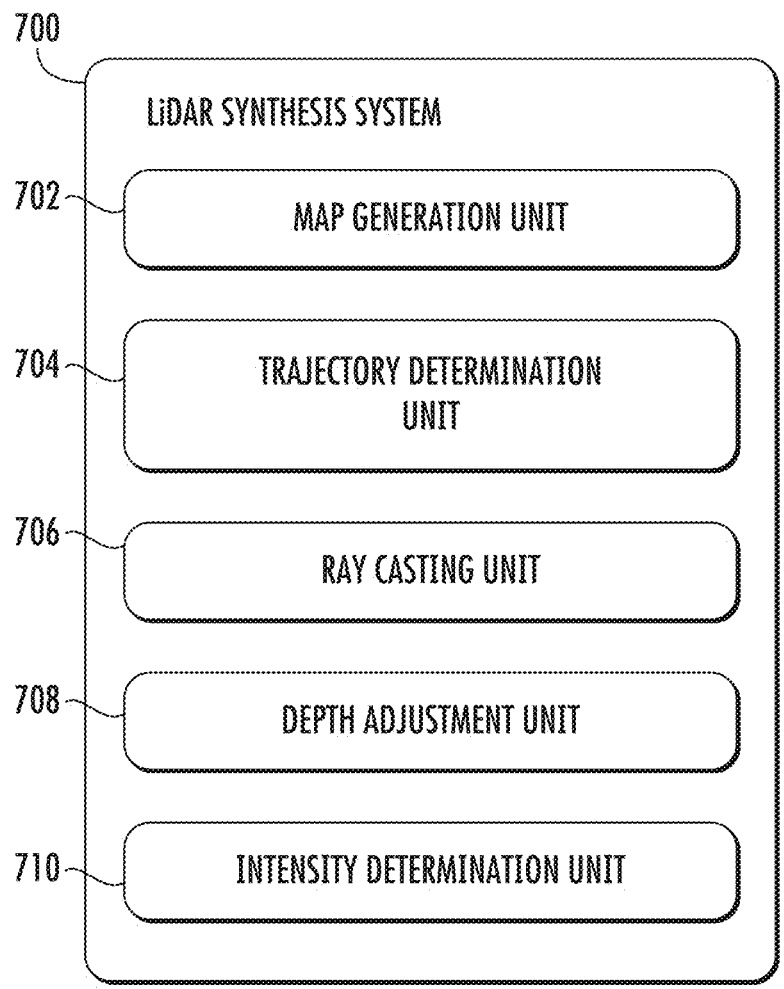
FIG. 7 depicts an example LiDAR data synthesis system according to example aspects of the present disclosure.

Various means can be configured to perform the methods and processes described herein. FIG. 7 depicts an example LiDAR data synthesis system 700 according to example aspects of the present disclosure. The system 700 can be or include map generation unit(s) 702; trajectory determination unit(s) 704; ray casting unit(s) 706; depth adjustment unit(s) 708; intensity determination unit(s) 710; and/or other means for performing the operations and functions described herein. In some implementations, one or more of the units may be implemented separately. In some implementations, one or more units may be a part of or included in one or more other units.

These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods (e.g., 500, 600) and/or other operations described herein can be implemented as such algorithm(s). For instance, the means (e.g., the map generation unit(s) 702) can be configured for determining generating a three-dimensional map of an environment. The means (e.g., the trajectory determination unit(s) 704) can be configured for determining a trajectory to test a scenario. In addition, the means (e.g., the ray casting unit(s) 706) can be configured to perform ray casting on the map according to the trajectory to generate an initial three-dimensional point cloud. The means (e.g., the depth adjustment unit(s) 708) can be configured for adjusting the respective depths of one or more of the points included in the initial three-dimensional point cloud to assist in generating an adjusted three-dimensional point cloud. The means (e.g., the intensity determination unit(s) 710) can be configured for determining an intensity for each point in the three-dimensional point cloud(s).

These described functions of the means are provided as examples and are not meant to be limiting. The means can be configured for performing any of the operations and functions described herein.

Example Autonomous Vehicle Systems

Figure 8:
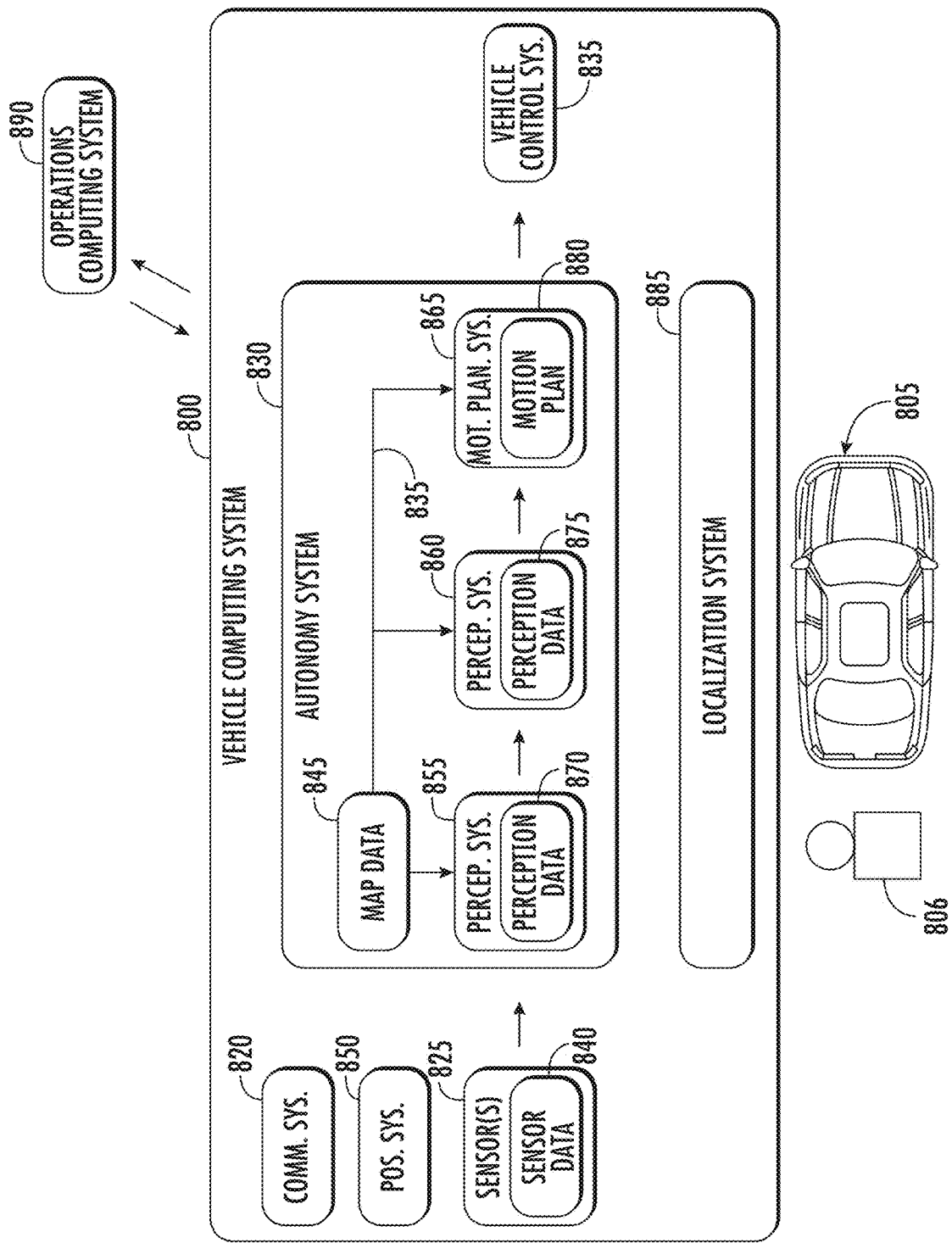
FIG. 8 depicts an example autonomous vehicle system according to example aspects of the present disclosure.

FIG. 8 illustrates an example vehicle computing system 800 according to example embodiments of the present disclosure. The vehicle computing system 800 can be associated with a vehicle 805. The vehicle computing system 800 can be located onboard (e.g., included on and/or within) the vehicle 805.

The vehicle 805 incorporating the vehicle computing system 800 can be various types of vehicles. The vehicle 805 can be an autonomous vehicle. For instance, the vehicle 805 can be a ground-based autonomous vehicle such as an autonomous car, autonomous truck, autonomous bus, autonomous bicycle, autonomous scooter, etc. The vehicle 805 can be an air-based autonomous vehicle (e.g., airplane, helicopter, or other aircraft) or other types of vehicles (e.g., watercraft, etc.). The vehicle 805 can drive, navigate, operate, etc. with minimal and/or no interaction from a human operator 806 (e.g., driver). An operator 806 can be included in the vehicle 805 and/or remote from the vehicle 805. In some implementations, the vehicle 805 can be a non-autonomous vehicle.

In some implementations, the vehicle 805 can be configured to operate in a plurality of operating modes. The vehicle 805 can be configured to operate in a fully autonomous (e.g., self-driving) operating mode in which the vehicle 805 is controllable without user input (e.g., can drive and navigate with no input from a vehicle operator present in the vehicle 805 and/or remote from the vehicle 805). The vehicle 805 can operate in a semi-autonomous operating mode in which the vehicle 805 can operate with some input from a vehicle operator present in the vehicle 805 (and/or a human operator that is remote from the vehicle 805). The vehicle 805 can enter into a manual operating mode in which the vehicle 805 is fully controllable by a vehicle operator (e.g., human driver, pilot, etc.) and can be prohibited and/or disabled (e.g., temporary, permanently, etc.) from performing autonomous navigation (e.g., autonomous driving). In some implementations, the vehicle 805 can implement vehicle operating assistance technology (e.g., collision mitigation system, power assist steering, etc.) while in the manual operating mode to help assist the vehicle operator of the vehicle 805.

The operating modes of the vehicle 805 can be stored in a memory onboard the vehicle 805. For example, the operating modes can be defined by an operating mode data structure (e.g., rule, list, table, etc.) that indicates one or more operating parameters for the vehicle 805, while in the particular operating mode. For example, an operating mode data structure can indicate that the vehicle 805 is to autonomously plan its motion when in the fully autonomous operating mode. The vehicle computing system 800 can access the memory when implementing an operating mode.

The operating mode of the vehicle 805 can be adjusted in a variety of manners. For example, the operating mode of the vehicle 805 can be selected remotely, off-board the vehicle 805. For example, a remote computing system (e.g., of a vehicle provider and/or service entity associated with the vehicle 805) can communicate data to the vehicle 805 instructing the vehicle 805 to enter into, exit from, maintain, etc. an operating mode. For example, in some implementations, the remote computing system can be an operations computing system 890, as disclosed herein. By way of example, such data communicated to a vehicle 805 by the operations computing system 890 can instruct the vehicle 805 to enter into the fully autonomous operating mode. In some implementations, the operating mode of the vehicle 805 can be set onboard and/or near the vehicle 805. For example, the vehicle computing system 800 can automatically determine when and where the vehicle 805 is to enter, change, maintain, etc. a particular operating mode (e.g., without user input). Additionally, or alternatively, the operating mode of the vehicle 805 can be manually selected via one or more interfaces located onboard the vehicle 805 (e.g., key switch, button, etc.) and/or associated with a computing device proximate to the vehicle 805 (e.g., a tablet operated by authorized personnel located near the vehicle 805). In some implementations, the operating mode of the vehicle 805 can be adjusted by manipulating a series of interfaces in a particular order to cause the vehicle 805 to enter into a particular operating mode.

The operations computing system 890 can be any remote device capable of communicating with the vehicle 805. For example, the operations computing system 890 can transmit signals to the vehicle 805 to control the vehicle 805. By way of example, a vehicle operator 806 can remotely operate the vehicle 805 via the operations computing system 890. In addition, or alternatively, the operations computing system 890 can transmit data to vehicle computing system 800.

The vehicle computing system 800 can include one or more computing devices located onboard the vehicle 805. For example, the computing device(s) can be located on and/or within the vehicle 805. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 805 (e.g., its computing system, one or more processors, etc.) to perform operations and functions, such as those described herein for determining a location based on image data.

The vehicle 805 can include a communications system 820 configured to allow the vehicle computing system 800 (and its computing device(s)) to communicate with other computing devices. The vehicle computing system 800 can use the communications system 820 to communicate with one or more computing device(s) that are remote from the vehicle 805 over one or more networks (e.g., via one or more wireless signal connections). In some implementations, the communications system 820 can allow communication among one or more of the system(s) on-board the vehicle 805. The communications system 820 can include any suitable components for interfacing with one or more network(s), including, for example, transmitters, receivers, ports, controllers, antennas, and/or other suitable components that can help facilitate communication.

As shown in FIG. 8, the vehicle 805 can include one or more vehicle sensors 825, an autonomy computing system 830, one or more vehicle control systems 835, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 825 can be configured to acquire sensor data 840. This can include sensor data associated with the surrounding environment of the vehicle 805. For instance, the vehicle sensor(s) 825 can acquire images and/or other data within a field of view of one or more of the vehicle sensor(s) 825. The vehicle sensor(s) 825 can include a Light Detection and Ranging (LiDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 840 can include image data, RADAR data, LiDAR data, and/or other data acquired by the vehicle sensor(s) 825. The vehicle 805 can also include other sensors configured to acquire data such as vehicle location data associated with the vehicle 805. For example, the vehicle 805 can include Global Positioning Sensors, inertial measurement unit(s), wheel odometry devices, and/or other sensors.

In addition to the sensor data 840, the autonomy computing system 830 can retrieve or otherwise obtain map data 845. The map data 845 can provide information about the surrounding environment of the vehicle 805. In some implementations, a vehicle 805 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 805 in comprehending and perceiving its surrounding environment and its relationship thereto. In some implementations, the vehicle computing system 800 can determine a vehicle route for the vehicle 805 based at least in part on the map data 845 and current location data (e.g., a current location estimate).

The vehicle 805 can include a positioning system 850. The positioning system 850 can determine a current position of the vehicle 805. The positioning system 850 can be any device or circuitry for analyzing the position of the vehicle 805. For example, the positioning system 850 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 805 can be used by various systems of the vehicle computing system 800 and/or provided to a remote computing system such as operations computing system 890. For example, the map data 845 can provide the vehicle 805 relative positions of the elements of a surrounding environment of the vehicle 805. The vehicle 805 can identify its position within the surrounding environment (e.g., across six axes, etc.) based at least in part on the map data 845. For example, the vehicle computing system 800 can process the sensor data 840 (e.g., LiDAR data, camera data, etc.) to match it to a map of the surrounding environment to get an understanding of the vehicle's position within that environment.

At times, the positioning system 850 can fail to precisely track the vehicle's location with respect to a particular environment, for example, due to sensor outages or imprecision, or algorithm failures. To increase localization accuracy the vehicle 805 can include a localization system 885 configured to accurately predict current location data (e.g., a current location estimate) associated with vehicle 805 with respect to its current environment. For example, the localization system 885 can utilize sensor data 840 in a processing pipeline that includes estimating the current geographical position of the vehicle 805 based on the sensor data 840. In this manner, the vehicle 805 can recover its position within its current environment, for instance, in the case that the vehicle 805 fails to track its pose due to sensor outages, algorithm failures, etc.

The autonomy computing system 830 can include a perception system 855, a prediction system 860, a motion planning system 865, and/or other systems that cooperate to perceive the surrounding environment of the vehicle 805 and determine a motion plan for controlling the motion of the vehicle 805 accordingly. For example, the autonomy computing system 830 can obtain the sensor data 840 from the vehicle sensor(s) 825, process the sensor data 840 (and/or other data) to perceive its surrounding environment, predict the motion of objects within the surrounding environment, and generate an appropriate motion plan through such surrounding environment. The autonomy computing system 830 can communicate with the one or more vehicle control systems 835 to operate the vehicle 805 according to the motion plan.

The vehicle computing system 800 (e.g., the autonomy computing system 830) can identify one or more objects that are proximate to the vehicle 805 based at least in part on the sensor data 840 and/or the map data 845. For example, the vehicle computing system 800 (e.g., the perception system 855) can process the sensor data 840, the map data 845, etc. to obtain perception data 870. The vehicle computing system 800 can generate perception data 870 that is indicative of one or more states (e.g., current and/or past state(s)) of a plurality of objects that are within a surrounding environment of the vehicle 805. For example, the perception data 870 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 855 can provide the perception data 870 to the prediction system 860, the motion planning system 865, and/or other system(s).

The prediction system 860 can be configured to predict a motion of the object(s) within the surrounding environment of the vehicle 805. For instance, the prediction system 860 can generate prediction data 875 associated with such object(s). The prediction data 875 can be indicative of one or more predicted future locations of each respective object. For example, the prediction system 860 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 875 can be indicative of the speed and/or acceleration at which the respective object is predicted to travel along its associated predicted motion trajectory. The prediction system 860 can output the prediction data 875 (e.g., indicative of one or more of the predicted motion trajectories) to the motion planning system 865.

The vehicle computing system 800 (e.g., the motion planning system 865) can determine a motion plan 880 for the vehicle 805 based at least in part on the perception data 870, the prediction data 875, and/or other data. A motion plan 880 can include vehicle actions (e.g., planned vehicle trajectories, speed(s), acceleration(s), other actions, etc.) with respect to one or more of the objects within the surrounding environment of the vehicle 805 as well as the objects' predicted movements. For instance, the motion planning system 865 can implement an optimization algorithm, model, etc. that considers cost data associated with a vehicle action as well as other objective functions (e.g., cost functions based on speed limits, traffic lights, etc.), if any, to determine optimized variables that make up the motion plan 880. The motion planning system 865 can determine that the vehicle 805 can perform a certain action (e.g., pass an object, etc.) without increasing the potential risk to the vehicle 805 and/or violating any traffic laws (e.g., speed limits, lane boundaries, signage, etc.). For instance, the motion planning system 865 can evaluate one or more of the predicted motion trajectories of one or more objects during its cost data analysis as it determines an optimized vehicle trajectory through the surrounding environment. The motion planning system 865 can generate cost data associated with such trajectories. In some implementations, one or more of the predicted motion trajectories may not ultimately change the motion of the vehicle 805 (e.g., due to an overriding factor). In some implementations, the motion plan 880 may define the vehicle's motion such that the vehicle 805 avoids the object(s), reduces speed to give more leeway to one or more of the object(s), proceeds cautiously, performs a stopping action, etc.

The motion planning system 865 can be configured to continuously update the vehicle's motion plan 880 and a corresponding planned vehicle motion trajectory. For example, in some implementations, the motion planning system 865 can generate new motion plan(s) for the vehicle 805 (e.g., multiple times per second). Each new motion plan can describe a motion of the vehicle 805 over the next planning period (e.g., next several seconds). Moreover, a new motion plan may include a new planned vehicle motion trajectory. Thus, in some implementations, the motion planning system 865 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 805.

The vehicle computing system 800 can cause the vehicle 805 to initiate a motion control in accordance with at least a portion of the motion plan 880. A motion control can be an operation, action, etc. that is associated with controlling the motion of the vehicle. For instance, the motion plan 880 can be provided to the vehicle control system(s) 835 of the vehicle 805. The vehicle control system(s) 835 can be associated with a vehicle controller (e.g., including a vehicle interface) that is configured to implement the motion plan 880. The vehicle controller can, for example, translate the motion plan into instructions for the appropriate vehicle control component (e.g., acceleration control, brake control, steering control, etc.). By way of example, the vehicle controller can translate a determined motion plan 880 into instructions to adjust the steering of the vehicle 805 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 880 (e.g., by sending control signal(s), making the translated plan available, etc.). This can allow the vehicle 805 to autonomously travel within the vehicle's surrounding environment.

As discussed above, the vehicle computing system 800 can include a localization system 885. The localization system 885 can determine a location of vehicle 805 based on sensor data 840 and/or other forms of data. In some implementations, the localization system 885 can be configured to operate in conjunction with the positioning system 850. For example, the localization system 885 can send data to and receive data from the vehicle positioning system 850. In some implementations, the localization system 885 can be included in or otherwise a part of a positioning system 850. The localization system 885 can include software and hardware configured to provide the functionality described herein. In some implementations, the localization system 885 can be implemented as a subsystem of a vehicle computing system 800. Additionally, or alternatively, the localization system 885 can be implemented via one or more computing devices that are remote from the vehicle 805.

The operator 806 can be associated with the vehicle 805 to take manual control of the vehicle, if necessary. For instance, in a testing scenario, a vehicle 805 can be periodically tested with controlled faults that can be injected into an autonomous vehicle's autonomy system 830. This can help the vehicle's response to certain scenarios. A vehicle operator 806 can be located within the vehicle 805 and/or remote from the vehicle 805 to take control of the vehicle 805 (e.g., in the event the fault results in the vehicle exiting from a fully autonomous mode in the testing environment). Although many examples implementations are described herein with respect to autonomous vehicles, the disclosed technology is not limited to autonomous vehicles.

Figure 9:
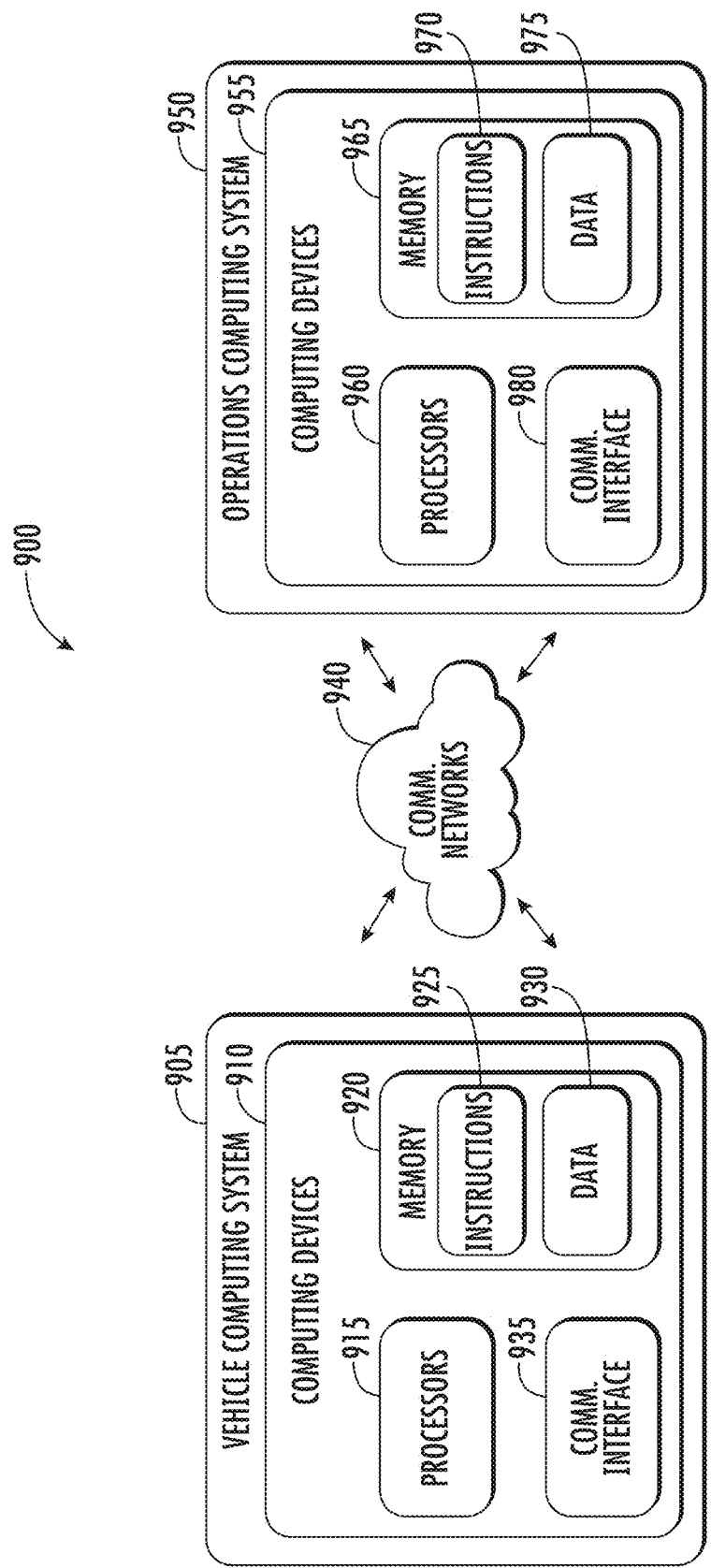
FIG. 9 depicts an example autonomous vehicle system according to example aspects of the present disclosure.

FIG. 9 depicts an example system 900 according to example embodiments of the present disclosure. The example system 900 illustrated in FIG. 9 is provided as an example only. The components, systems, connections, and/or other aspects illustrated in FIG. 9 are optional and are provided as examples of what is possible, but not required, to implement the present disclosure. The example system 900 can include a vehicle computing system 905 of a vehicle. The vehicle computing system 905 can represent/correspond to the vehicle computing systems described herein (e.g., vehicle computing system 100). The example system 900 can include a remote computing system 950 (e.g., that is remote from the vehicle computing system 905). The remote computing system 950 can represent/correspond to, for example, any of the computing systems that are remote from the vehicle described herein (e.g., the operations computing system 190, etc.). The vehicle computing system 905 and the remote computing system 950 can be communicatively coupled to one another over one or more network(s) 940.

The computing device(s) 910 of the vehicle computing system 905 can include processor(s) 915 and a memory 920. The one or more processors 915 can be any suitable processing device (e.g., a processor core, a microprocessor, an ASIC, a FPGA, a controller, a microcontroller, etc.) and can be one processor or a plurality of processors that are operatively connected. The memory 920 can include one or more non-transitory computer-readable storage media, such as RAM, ROM, EEPROM, EPROM, one or more memory devices, flash memory devices, data registrar, etc., and combinations thereof.

The memory 920 can store information that can be accessed by the one or more processors 915. For instance, the memory 920 (e.g., one or more non-transitory computer-readable storage mediums, memory devices) on-board the vehicle can include computer-readable instructions 925 that can be executed by the one or more processors 915. The instructions 925 can be software written in any suitable programming language or can be implemented in hardware. Additionally, or alternatively, the instructions 925 can be executed in logically and/or virtually separate threads on processor(s) 915.

For example, the memory 920 can store instructions 925 that when executed by the one or more processors 915 cause the one or more processors 915 (the vehicle computing system 905) to perform operations such as any of the operations and functions of the vehicle computing system 100 (or for which it is configured), one or more of the operations and functions of the localization system (or for which it is configured), one or more of the operations and functions of the operations computing systems 195 described herein (or for which it is configured), one or more of the operations and functions for determining the current location estimate of a vehicle, one or more portions of the methods 500, 600, 700, and/or one or more of the other operations and functions of the computing systems described herein.

The memory 920 can store data 930 that can be obtained (e.g., acquired, received, retrieved, accessed, created, stored, written, manipulated, etc.). The data 930 can include, for instance, sensor data, map data, vehicle state data, perception data, prediction data, motion planning data, data associated with a vehicle client, data associated with a service entity's telecommunications network, data associated with an API, data associated with one or more images such as image location data, data indicative of one or more image embeddings, data indicative of one or more feature representations, and/or other data/information such as, for example, that described herein. In some implementations, the computing device(s) 910 can obtain data from one or more memories that are remote from the vehicle computing system 905.

The computing device(s) 910 can also include a communication interface 935 used to communicate with one or more other system(s) on-board a vehicle and/or a remote computing device that is remote from the vehicle (e.g., of the remote computing system 950). The communication interface 935 can include any circuits, components, software, etc. for communicating via one or more networks (e.g., network(s) 1040). The communication interface 935 can include, for example, one or more of a communications controller, receiver, transceiver, transmitter, port, conductors, software and/or hardware for communicating data.

The remote computing system 950 can include one or more computing device(s) 955 that are remote from the vehicle computing system 905. The computing device(s) 955 can include one or more processors 960 and a memory 965. The one or more processors 960 can be any suitable processing device (e.g., a processor core, a microprocessor, an ASIC, a FPGA, a controller, a microcontroller, etc.) and can be one processor or a plurality of processors that are operatively connected. The memory 965 can include one or more tangible, non-transitory computer-readable storage media, such as RAM, ROM, EEPROM, EPROM, one or more memory devices, flash memory devices, data registrar, etc., and combinations thereof.

The memory 965 can store information that can be accessed by the one or more processors 960. For instance, the memory 965 (e.g., one or more tangible, non-transitory computer-readable storage media, one or more memory devices, etc.) can include computer-readable instructions 970 that can be executed by the one or more processors 960. The instructions 970 can be software written in any suitable programming language or can be implemented in hardware. Additionally, or alternatively, the instructions 970 can be executed in logically and/or virtually separate threads on processor(s) 960.

For example, the memory 965 can store instructions 970 that when executed by the one or more processors 960 cause the one or more processors 960 to perform operations such as any of the operations and functions of the operations computing systems 195 described herein, any of the operations and functions of the localization system 185 as described herein, one or more of the operations and functions for determining a current location estimate of an autonomous vehicle, one or more portions of the methods 500, 600, 700, and/or one or more of the other operations and functions described herein.

The memory 965 can store data 975 that can be obtained. The data 975 can include, for instance, data associated with vehicles (sensor data, vehicle location data, map data, vehicle state data, perception data, prediction data, motion planning data, data associated with a vehicle client, data associated with a service entity's telecommunications network, data associated with an API, etc.), data indicative of one or more images (e.g., global image database 230), data indicative of one or more image embeddings (e.g., image embedding database 250), data indicative of one or more feature representations (e.g., feature embedding database 260), and/or other data/information such as, for example, that described herein. In some implementations, the computing device(s) 955 can obtain data from one or more memories that are remote from the computing system 950 and/or are onboard a vehicle.

The computing device(s) 955 can also include a communication interface 980 used to communicate with one or more system(s) local to and/or remote from the computing system 950. The communication interface 980 can include any circuits, components, software, etc. for communicating via one or more networks (e.g., network(s) 940). The communication interface 980 can include, for example, one or more of a communications controller, receiver, transceiver, transmitter, port, conductors, software and/or hardware for communicating data.

The network(s) 940 can be any type of network or combination of networks that allows for communication between devices. In some implementations, the network(s) 940 can include one or more of a local area network, wide area network, the Internet, secure network, cellular network, mesh network, peer-to-peer communication link and/or some combination thereof and can include any number of wired or wireless links. Communication over the network(s) 940 can be accomplished, for instance, via a communication interface using any type of protocol, protection scheme, encoding, format, packaging, etc.

Computing tasks, operations, and functions discussed herein as being performed at a vehicle (e.g., via the vehicle computing system 100, localization system 185, etc.) can instead be performed by computing device(s) that are remote from the vehicle (e.g., via a vehicle provider computing system, an operations computing system 190, etc.), and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems can alter the communicated data in some manner before communicating it to another computing system. Moreover, data obtained by a computing system can be manipulated in some manner before it is communicated to another system.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The number and configuration of elements shown in the figures is not meant to be limiting. More or less of those elements and/or different configurations can be utilized in various embodiments.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 5 and 6 respectively depict steps performed in a particular order for purposes of illustration and discussion, the methods of the present disclosure are not limited to the particularly illustrated order or arrangement. The various steps of the methods 500 and 600 can be omitted, rearranged, combined, and/or adapted in various ways without deviating from the scope of the present disclosure.

What is claimed is:

1. A computer-implemented method to generate synthetic light detection and ranging (LiDAR) data, the method comprising:
generating, using a physics-based simulation engine and based at least in part on an object in an environment, an initial point cloud that comprises a plurality of points descriptive of the object; and
generating, using a machine-learned geometry network and based at least in part on the initial point cloud, an adjusted point cloud,
wherein the machine-learned geometry network was trained by evaluating a loss over synthetic point clouds generated using the machine-learned geometry network and ground truth point clouds collected by a physical LiDAR system, the loss configured to correspond to a perceptual similarity between the synthetic point clouds and the ground truth point clouds.

2. The computer-implemented method of claim 1, comprising:
inputting the adjusted point cloud to a machine-learned perception system for an autonomous vehicle to simulate real-world LIDAR data; and
evaluating an output of the machine-learned perception system generated based at least in part on the adjusted point cloud.

3. The computer-implemented method of claim 1, wherein the adjusted point cloud corresponds to a new view of the object.

4. The computer-implemented method of claim 1, wherein the object is a virtual object inserted into the environment.

5. The computer-implemented method of claim 1, comprising:
   simulating a virtual LIDAR system moving along a trajectory through the environment,
   wherein the adjusted point cloud corresponds to a simulated output of the virtual LIDAR system.

6. The computer-implemented method of claim 5, wherein simulating the virtual LIDAR system comprises determining a ray casting location and a ray casting direction based at least in part on the trajectory, the ray casting location and the ray casting direction being used by the physics-based simulation engine to generate the initial point cloud.

7. The computer-implemented method of claim 1, comprising:
   obtaining real-world LiDAR data of the object physically collected by a LiDAR system in the environment;
   converting the real-world LiDAR data to a mesh representation of the object; and
   generating the initial point cloud using the mesh representation of the object.

8. A computing system comprising:
   one or more processors; and
   one or more non-transitory computer-readable media storing instructions that are executable to cause the one or more processors to perform operations, the operations comprising:
      generating, using a physics-based simulation engine and based at least in part on an object in an environment, an initial point cloud that comprises a plurality of points descriptive of the object; and
      generating, using a machine-learned geometry network and based at least in part on the initial point cloud, an adjusted point cloud,
      wherein the machine-learned geometry network was trained by evaluating a loss over synthetic point clouds generated using the machine-learned geometry network and ground truth point clouds collected by a physical LiDAR system, the loss configured to correspond to a perceptual similarity between the synthetic point clouds and the ground truth point clouds.

9. The computing system of claim 8, wherein the operations further comprise:
   inputting the adjusted point cloud to a machine-learned perception system for an autonomous vehicle to simulate real-world LIDAR data; and
   evaluating an output of the machine-learned perception system generated based at least in part on the adjusted point cloud.

10. The computing system of claim 8, wherein the adjusted point cloud corresponds to a new view of the object.

11. The computing system of claim 8, wherein the object is a virtual object inserted into the environment.

12. The computing system of claim 11, wherein the virtual object is a virtual vehicle inserted into the environment.

13. The computing system of claim 8, wherein the operations further comprise:
   simulating a virtual LIDAR system moving along a trajectory through the environment,
   wherein the adjusted point cloud corresponds to a simulated output of the virtual LIDAR system.

14. The computing system of claim 13, wherein simulating the virtual LIDAR system comprises determining a ray casting location and a ray casting direction based at least in part on the trajectory, the ray casting location and the ray casting direction being used by the physics-based simulation engine to generate the initial point cloud.

15. The computing system of claim 8, wherein the operations further comprise:
   obtaining real-world LiDAR data of the object physically collected by a LiDAR system in the environment;
   converting the real-world LiDAR data to a mesh representation of the object; and
   generating the initial point cloud using the mesh representation of the object.

16. The computing system of claim 8, wherein the computing system is onboard an autonomous vehicle.

17. The computing system of claim 16, wherein the autonomous vehicle is an autonomous truck.

18. A system for training geometry models for generating synthetic light detection and ranging (LiDAR) data, the system comprising:
   one or more processors; and
   one or more non-transitory computer-readable media storing instructions that are executable to cause the one or more processors to perform operations, the operations comprising:
      generating, using a physics-based simulation engine and based at least in part on an object in an environment, an initial point cloud that comprises a plurality of points descriptive of the object; and
      generating, using a machine-learned geometry network and based at least in part on the initial point cloud, an adjusted point cloud;
      evaluating a loss over the adjusted point cloud and a corresponding ground truth point cloud collected by a physical LiDAR system, the loss configured to correspond to a perceptual similarity between the adjusted point cloud and the corresponding ground truth point cloud collected; and
      updating one or more parameters of the machine-learned geometry network based at least in part on the loss.

19. The system of claim 18, wherein the operations further comprise:
   obtaining real-world LiDAR data of the object physically collected by a LiDAR system in the environment;
   converting the real-world LiDAR data to a mesh representation of the object; and
   generating the initial point cloud using the mesh representation of the object.

20. The system of claim 18, wherein the object is a virtual object inserted into the environment.

* * * * *